US009278279B2

(12) United States Patent
Fujimoto

(10) Patent No.: US 9,278,279 B2
(45) Date of Patent: Mar. 8, 2016

(54) GAMING MACHINE AND GAMING MANAGEMENT SYSTEM

(75) Inventor: Jun Fujimoto, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 501 days.

(21) Appl. No.: 13/413,020

(22) Filed: Mar. 6, 2012

(65) Prior Publication Data

US 2012/0172115 A1 Jul. 5, 2012

Related U.S. Application Data

(63) Continuation of application No. 12/417,905, filed on Apr. 3, 2009, now Pat. No. 8,152,638.

(30) Foreign Application Priority Data

| Apr. 16, 2008 | (JP) | 2008-107251 |
| Apr. 16, 2008 | (JP) | 2008-107252 |
| Apr. 16, 2008 | (JP) | 2008-107253 |

(51) Int. Cl.
*A63F 9/24* (2006.01)
*A63F 13/00* (2014.01)

(52) U.S. Cl.
CPC .. *A63F 9/24* (2013.01); *A63F 13/00* (2013.01)

(58) Field of Classification Search
USPC ........................................ 463/34, 47
See application file for complete search history.

(56) References Cited

U.S. PATENT DOCUMENTS

| 6,641,484 B2 * | 11/2003 | Oles et al. ............... 463/47 |
| 2003/0199316 A1 * | 10/2003 | Miyamoto et al. ........ 463/35 |
| 2008/0269016 A1 * | 10/2008 | Ungari ............. A63B 69/0053 482/1 |

* cited by examiner

*Primary Examiner* — Thomas L Dickey
(74) *Attorney, Agent, or Firm* — Lex IP Meister, PLLC

(57) ABSTRACT

A gaming machine includes a housing, which is playable by a plurality of players, that has a station provided for each individual player; an operation detection unit that detects an operation of a player present at each of the stations performing a bet operation through a bet image displayed on the image display unit; an image capturing unit, provided at the housing, that can capture images of a player present at each of the stations, and a determination unit that determines tampering or an error of a game by comparing image capturing information obtained by the image capturing unit with predetermined information.

5 Claims, 26 Drawing Sheets

(a)

(b)

(a)

(b)

(a)

(b)

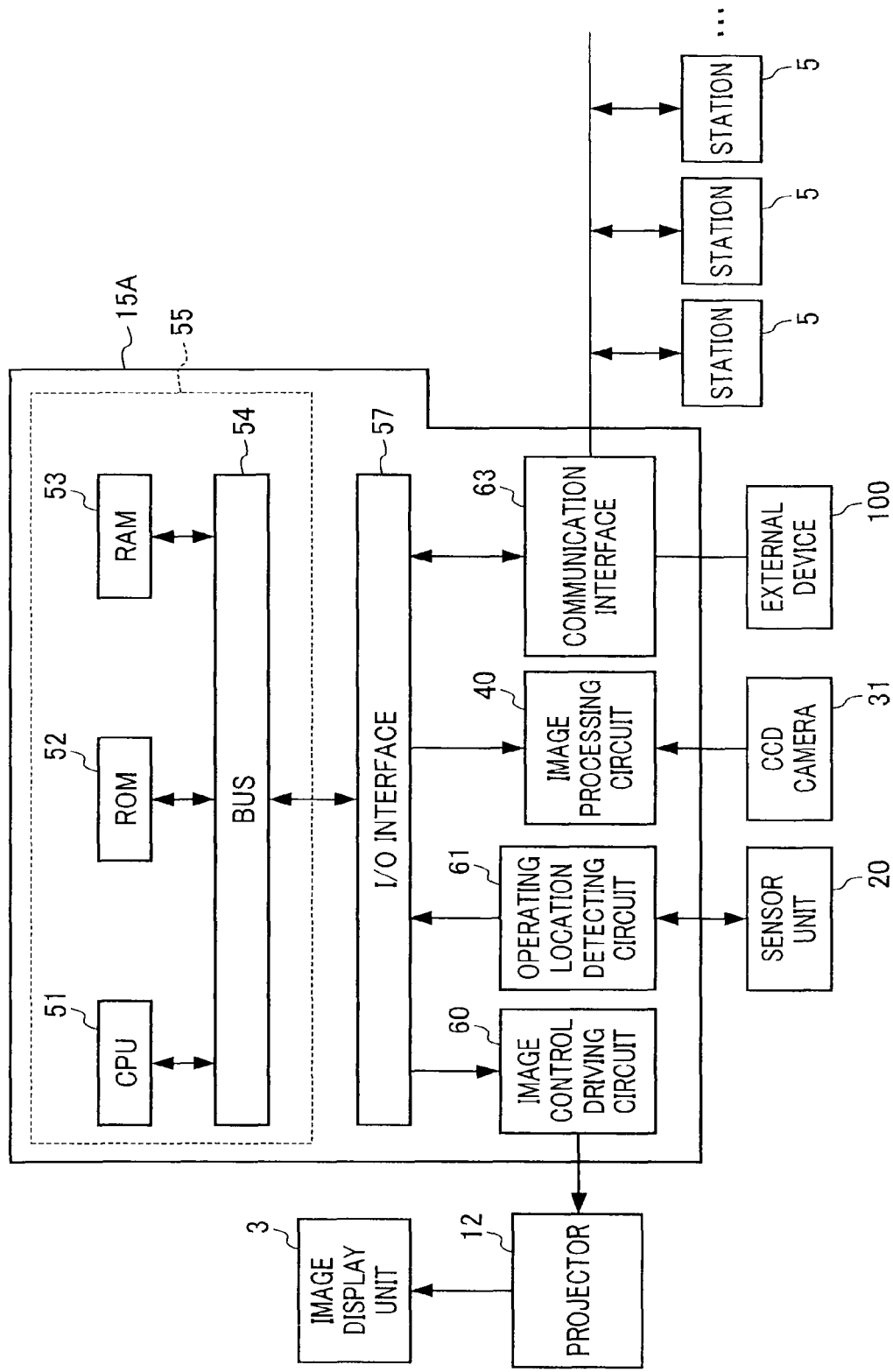

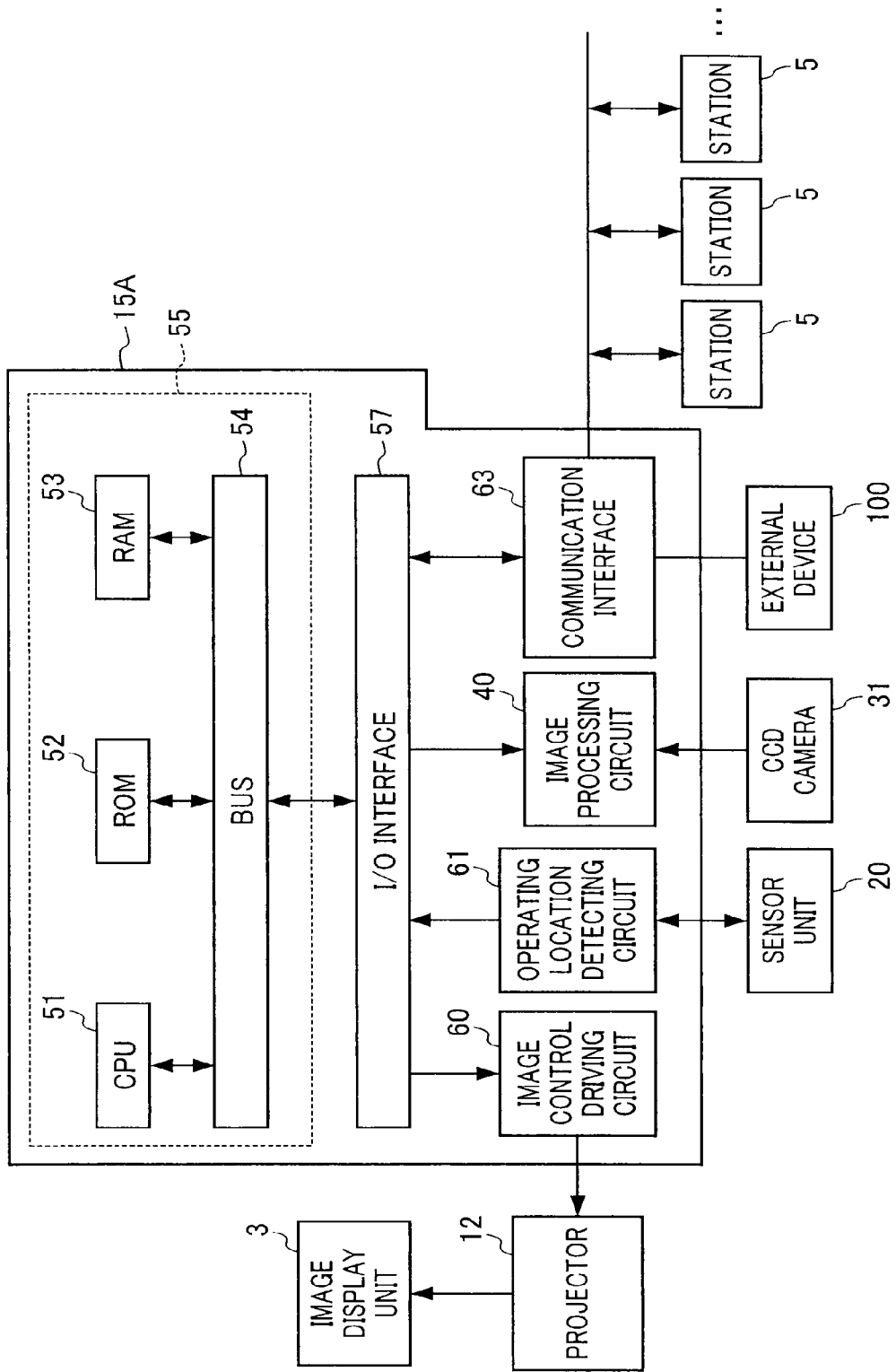

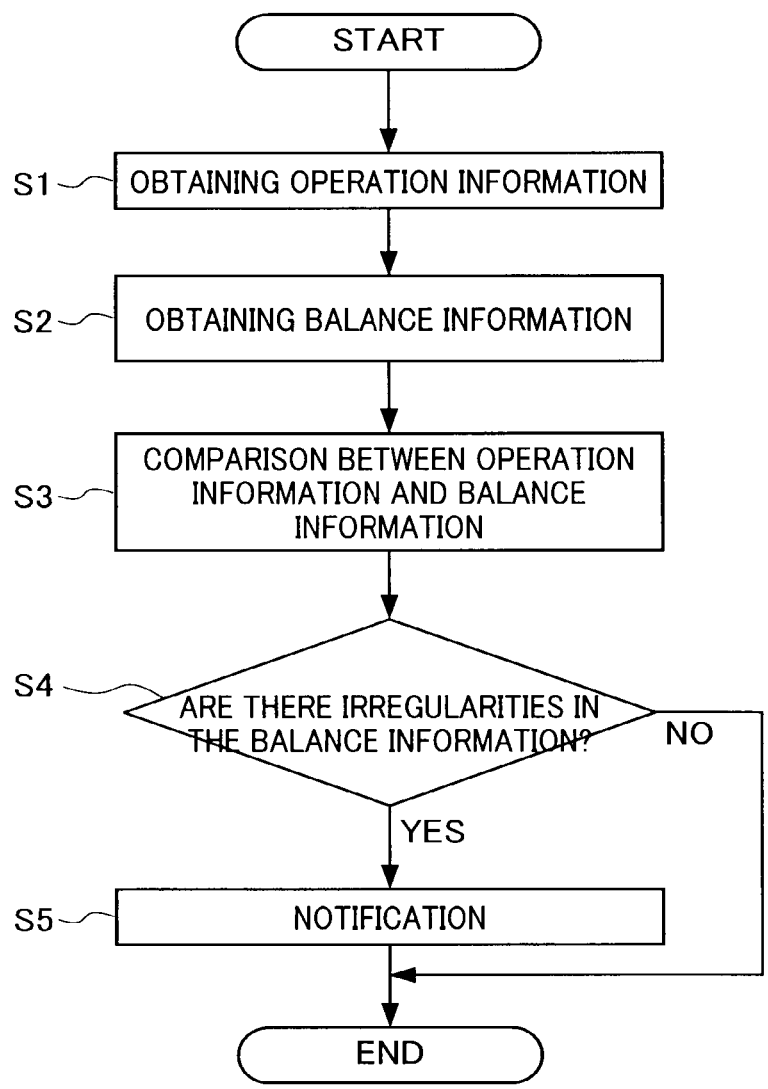

(a)

(b)

(c)

GAMING MACHINE AND GAMING MANAGEMENT SYSTEM

CROSS REFERENCE TO RELATED APPLICATIONS

This application is based on and claims the benefit of priority from Japanese Patent Application Nos. 2008-107251, 2008-107252 and 2008-107253, respectively filed on 16 Apr. 2008, the contents of which are incorporated herein by reference.

BACKGROUND OF THE INVENTION

1. Field of the Invention

The present invention relates to a gaming machine including an image display unit and a plurality of game stations, provided for each player, through which the players can participate in a game executed in the image display unit, and a gaming management system that manages a game of the gaming machine.

2. Related Art

Generally, various types of gaming machines are installed at an amusement facility, a casino, and the like. One configuration has been known which is composed of an image display unit and a plurality of game stations (hereinafter, referred to as a station), provided for each player, through which the players can participate in a game executed in the image display unit.

Such a gaming machine includes an image display unit on which a game is executed and a plurality of stations provided around the image display unit. Then, each of the players participates in a game executed on the image display unit at each of the stations. Furthermore, each of the stations is provided with a gaming medium processing unit for processing gaming media (mainly, insertion processing and payout processing) such as money, medals, or the like, used for executing a game, and a bet operation unit for performing a bet operation for a game executed in the image display unit.

For example, a configuration disclosed in Japanese Unexamined Application, Publication No. 2005-317032 has been known as a gaming machine capable of executing the abovementioned game. This gaming machine includes a table-shaped housing, and can project various images (for example, a bet operation image) necessary for a gaming image and a game by way of a projector installed in the housing with respect to the image display unit (a display) installed in a horizontal state. Furthermore, a detection means is provided in the housing which includes a light source irradiating an infrared light toward the image display unit so as to detect various operations (such as a bet operation), which a player executes through the image display unit, and a camera receiving reflected light reflected from a player's finger irradiated by the light source, the finger moving over the image display unit. According to the gaming machine thus configured, a player can participate in a game by performing various operations, for example, by moving the player's finger on the image display unit in a game executed on the image display unit provided on a surface of the housing.

Here, as a first problem, in a gaming machine thus configured as described above, for example, there may be a case in which there is no observer such as a dealer who advances, manages, and monitors a game or in which it is difficult to confirm every operation of all the players even if there is an observer. Therefore, it is difficult for a management party of an amusement facility to recognize potential fraudulence in a game. More specifically, in a case in which such fraudulence may affect a balance status of a gaming machine, the management party of the amusement facility may suffer a substantial loss if the management party cannot recognize it.

The invention in relation to the first problem addresses the abovementioned matter, and thus, it is an object of the present invention to provide a gaming machine and a game management system that can effectively prevent fraudulence in a game and, more specifically, prevent fraudulence which may affect a balance of a gaming machine under a gaming environment where there is substantially no observer.

In addition, as a second problem, in a gaming machine thus configured as described above, there are possibilities that, in a case in which a plurality of stations are provided so that a plurality of players can participate in a game, fairness in a game can be damaged or fraudulent operations are performed.

For example, the abovementioned detection means provided in the housing simply determines whether there is a bet operation by a player and manages the bet operation for each of the stations and, in reality, cannot determine whether the player present at the station of interest has performed the bet operation. Therefore, even in a case in which a person who is not concerned with the station of interest performs an operation accidentally or performs operations maliciously by remote control, the game continues, and thus a bet operation may be accepted and payout processing may be executed.

The invention in response to the second problem addresses the abovementioned matter, and thus, it is an object of the present invention to provide a gaming machine that can specify whether an operation is performed by an actual player with progression of the game.

In addition, as a third problem, in a gaming machine thus configured as described above, for example, there may be a case in which there is no observer such as a dealer who advances, manages, and monitors a game. Therefore, it is difficult for a management party of an amusement facility to visually recognize a gaming status and to recognize potential fraudulence in a game.

The invention in relation to the third problem addresses the abovementioned matter, and thus, it is an object of the present invention to visually recognize a gaming status and potential fraudulence in a game under a gaming environment where there is no observer.

SUMMARY OF THE INVENTION

In the following, a first aspect of the present invention is a means for solving the first to third problems; second to ninth aspects of the present invention are means for solving the first problem; tenth to twelfth aspects of the present invention are means for solving the abovementioned second problem; and thirteenth to seventeenth aspects of the present invention are means for solving the third problem.

According to a first aspect of the present invention, a gaming machine is provided, which includes:

a housing, which is playable by a plurality of players, that includes a station provided to each player, respectively;

an image display unit, which is provided at the housing, that displays a game image and a bet image corresponding to each of the stations;

an image control unit that includes game image data for a game displayed on the image display unit and bet operation image data, and controls an image displayed on the image display unit;

an operation detection unit which detects an operation of a player present at each of the stations performing a bet operation through a bet image displayed on the image display unit;

an image capturing unit, provided at the housing, that can photograph a player present at each of the stations; and a determination unit that determines tampering or an error of a game by comparing a captured information obtained by the image capturing unit with predetermined information.

According to a second aspect of the present invention, a gaming machine is provided which includes:

a housing, which is playable by a plurality of players, that includes a station provided for each player, respectively;

an image display unit, which is provided at the housing, that displays a game image and a bet image corresponding to each of the stations;

an image control unit that includes a game image data for a game displayed on the image display unit and a bet operation image data, and controls an image displayed on the image display unit;

an operation detection unit for detecting an operation of a player present at each of the stations performing a bet operation through a bet image displayed on the image display unit;

an image capturing unit, provided at the housing, that can photograph a player present at each of the stations;

a balance status monitoring unit that monitors a balance status of a gaming value in relation to an amount of a gaming value paid out to a player according to a game result compared with a gaming value paid for a game by way of a bet operation; and a determination unit that determines tampering or an error of a game by comparing a running state of a game based on at least a detection signal from the operation detection unit and an image capturing signal from the image capturing unit with a balance status that is monitored by the balance status monitoring unit.

According to the gaming machine of the second aspect, since the balance status of the gaming value can be monitored by way of the balance status monitoring unit, even though there is no observer such as a dealer who advances, manages, and monitors a game or it is difficult to confirm every operation of all the players, even if there is an observer, it can effectively prevent fraudulence which may affect a balance of a gaming machine. Moreover, in the present configuration, since an operating state is recognized based on a bet operation by a player and a live image of the player by using the operation detection unit and the image capturing unit, respectively, and then, the running state is compared with a balance status, it is easy to determine fraudulence or an error in a game, which can effectively prevent fraudulence reliably and effectively that may otherwise affect a balance status of a gaming machine.

According to a third aspect of the present invention, the gaming machine according to the second aspect is provided which further includes a notification unit that, in a case in which the determination unit determines that a game has tampering or an error, notifies information thereof.

According to the gaming machine of the third aspect, the similar operational effect to the gaming machine described in the second aspect can be obtained, and in a case in which a game is determined to have fraudulence or an error, the CPU notifies thereof, and consequently, the fraudulence or error of the game can be easily recognized. It should be noted that "the notification unit" in the present configuration includes various modes such as visual notification and sound notification.

According to a fourth aspect of the present invention, a gaming management system is provided, which includes:

a plurality of gaming machines according to the second aspect;

a host computer that is connected to each of a plurality of the gaming machines, and receives information relating to a balance status from the balance status monitoring unit at each of the gaming machines; and a display unit that is connected to the host computer, and displays information relating to a balance status of each of the gaming machines received by the host computer.

According to the gaming management system of the fourth aspect, since a balance status of gaming values at a plurality of the gaming machines can be collectively monitored at the host computer, even though there is no observer such as a dealer who advances, manages, and monitors a game at each of the gaming machines or it is difficult to confirm every operation of all the players, even if there is an observer, the present invention can effectively and collectively prevent fraudulence which may otherwise affect a balance status of a plurality of the gaming machines, i.e. the entire amusement facility.

According to a fifth aspect of the present invention, the gaming management system according to the fourth aspect is provided in which:

the host computer receives a detection signal from the operation detection unit of each of the gaming machines and an image capturing signal from the image capturing unit at each of the gaming machines, as well as determines tampering or an error of a game by comparing a operating state of a game based on at least the detection signal and the image capturing signal with a balance status monitored by the balance status monitoring unit.

According to the gaming management system of the fifth aspect, a similar operational effect to the gaming management system described in the fourth aspect can be obtained, and since a running state for each of the gaming machines is recognized based on a bet operation by a player and a live image of the player by using the operation detection unit and the image capturing unit, respectively, and then, the running state is compared with a balance status, it is easy to determine fraudulence or an error in a game, which can effectively prevent fraudulence reliably and effectively which may otherwise affect a balance of the entire amusement facility.

According to a sixth aspect of the present invention, the gaming management system according to the fifth aspect is provided in which the host computer, in a case in which the host computer determines that a game has tampering or an error, notifies information thereof.

According to the gaming management system of the sixth aspect, a similar operational effect to the gaming management system described in the fifth aspect can be obtained, and in a case in which a game is determined to have fraudulence or an error, the information regarding the determination is notified on the host computer side. Therefore, the fraudulence or error of the game can be easily and collectively recognized on, for example, a management party side of the amusement facility. It should be noted that "the notification unit" in the present configuration includes various modes such as visual notification and sound notification.

According to a seventh aspect of the present invention, a gaming management system is provided, which includes:

a plurality of the gaming machines according to claim 3;

a host computer that is connected to each of the plurality of the gaming machines, and receives information relating to a balance status from the balance status monitoring unit of each of the gaming machines; and a display unit that is connected to the host computer, and displays information relating to a balance status of each of the gaming machines received by the host computer.

According to the gaming management system of the seventh aspect, a similar operational effect to the gaming management system described in the fourth aspect can be obtained.

According to an eighth aspect of the present invention, the gaming management system according to the seventh aspect is provided in which:

the host computer receives a detection signal from the operation detection unit of each of the gaming machines and an image capturing signal from the image capturing unit at each of the gaming machines, and determines tampering or an error of a game by comparing an operating state of a game based on at least the detection signal and the image capturing signal with a balance status monitored by the balance status monitoring unit.

According to the gaming management system of the eighth aspect, a similar operational effect to the gaming management system described in the fifth aspect can be obtained.

According to ninth aspect of the present invention, the gaming management system according to the eighth aspect is provided in which the host computer, in a case in which the host computer determines that a game includes fraudulence or an error, notifies information thereof.

According to the gaming management system of the ninth aspect, a similar operational effect to the gaming management system described in the sixth aspect can be obtained.

According to a tenth aspect of the present invention, a gaming machine is provided, which includes:

a housing, which is playable by a plurality of players, that includes a station provided to each player, respectively;

an image display unit, which is provided at the housing, that displays a game image and a bet image corresponding to each of the stations;

a game control unit that includes game image data for a game which is displayed on the image display unit and bet operation image data, controls an image displayed on the image display unit, and executes a game;

an operation detection unit for detecting an operation of a player present at each of the stations performing a bet operation through a bet image displayed on the image display unit;

an image capturing unit, provided at the housing, that can photograph a player present at each of the stations; and a determination unit that determines whether a bet operation information has been executed by a player present at a station of interest, based on a bet operation information for each of the stations obtained by the operation detection unit and an image capturing information for each of the stations obtained by the image capturing unit.

According to the gaming machine of the tenth aspect, a plurality of the players can participate in the game, via a plurality of the stations, executed at the image display unit provided in the housing. Each of the players performs a bet operation at each of the stations, and this bet operation information is detected by the operation detection unit and the bet information is controlled for each of the stations. In this case, the image capturing unit provided in the housing photographs a bet operation of a player, and thus, an actual player is identified by using the player capturing information and actual bet information. Therefore, it is possible to detect an erroneous operation or a fraudulent operation by a person other than the player present at the station.

According to an eleventh aspect of the present invention, the gaming machine according to the tenth aspect is provided in which:

the image capturing unit captures a game image that is executed by the image display unit; and the determination unit executes the determination based on a bet operation image of a player to the game image thus obtained by the image capturing unit and image information displayed on the image display unit.

According to the gaming machine of the eleventh aspect, each time a game is executed, it is possible to obtain, by way of the image capturing unit, actual game image information executed at the image display unit and bet operation image information of a player playing a game thereat. Then, by comparing the image thus obtained with image information displayed on the image display unit, it is possible to determine whether the bet operation has been performed by an actual player present at the station.

According to a twelfth aspect of the present invention, the gaming machine according to the tenth aspect is provided in which the determination unit generates a reference image in which a player does not exist using image information that is displayed on the image display unit and image capturing information obtained by the image capturing unit, and carries out determination based on the reference image and image capturing information of a player at each of the stations obtained by the image capturing unit.

According to the gaming machine of the twelfth aspect, each time a game is executed, based on actual game image information executed at the image display unit and image information of portions (such as a housing area) other than the actual game image information, a reference image showing a state in which there is no player is generated. By comparing the reference image with capturing information of a player at each of the stations, it is possible to determine whether a bet operation was performed by an actual player present at the station.

According to a thirteenth aspect of the present invention, a gaming machine is provided, which includes:

a housing, which is playable by a plurality of players, that includes a station provided for each of the players, respectively;

an image display unit, which is provided at the housing, that displays a game image and a bet image corresponding to each of the stations;

an image control unit that includes game image data for a game displayed on the image display unit and bet operation image data, and controls an image displayed on the image display unit;

an operation detection unit which detects an operation of a player present at each of the stations performing a bet operation through a bet image displayed on the image display unit; and an image capturing unit, provided at the housing, that can photograph a player present at each of the stations, wherein the image capturing unit is fixed to be integrated to the housing.

According to the gaming machine of the thirteenth aspect, since the image capturing unit which can photograph the player present at each of the stations is integrally formed with the housing, and the housing and the image capturing unit are configured as a single unit, as the entire gaming machine, a gaming state and fraudulence in a game can be visually recognized by way of the image capturing unit which is inherently provided with the gaming machine, and thus, fraudulence in a game can be easily recognized.

According to a fourteenth aspect of the present invention, the gaming machine according to the thirteenth aspect is provided in which the image capturing unit is fixed to a supporting member which extends from the housing.

According to the gaming machine of the fourteenth aspect, a similar operational effect to the gaming machine described in the thirteenth aspect can be obtained, and a gaming area can be captured extensively as a whole so as to space the image capturing unit away from a gaming area such as the station and the image display unit, and the image capturing unit also can be securely supported by the supporting member.

According to a fifteenth aspect of the present invention, the gaming machine according to the fourteenth aspect is provided in which the supporting members extends upward from four corners of the housing, respectively, and the image capturing unit is supported by the supporting member close to the center of the image display unit at an upper side of the housing.

According to the gaming machine of the fifteenth aspect, a similar operational effect to the gaming machine described in the fourteenth aspect can be obtained, and thus, since the image capturing unit can be securely supported above the image display unit by the supporting member, and the image capturing unit is supported at the center of the image display unit by the supporting member, even a single image capturing unit can capture the entire image display unit effectively.

According to a sixteenth aspect of the present invention, the gaming machine according to the fourteenth aspect is provided in which the supporting member extends from four corners of the housing, respectively, and the image capturing unit is supported by the supporting member at the four corners of the housing.

According to the gaming machine of the sixteenth aspect, a similar operational effect to the gaming machine described in the fourteenth aspect can be obtained, and since the image capturing unit is supported at the four corners of the housing, a player and a surrounding environment of the image display unit can be captured diagonally with respect to the image display unit, and thus, the player and the surrounding environment of the image display unit can be captured clearly from the front. Thus, it can enhance visual recognition and can visually recognize a gaming state, fraudulence, and the like reliably.

According to the seventeenth aspect of the present invention, the gaming machine according to the thirteenth aspect is provided, in which the image capturing unit is disposed so as to face each of the stations.

According to the gaming machine of the seventeenth aspect, a similar operational effect to the gaming machine described in the thirteenth aspect can be obtained, and since each of the stations can be captured directly from the front by way of the image capturing unit, a face of a player playing at each of the stations can be photographed reliably, thereby enabling visual recognition of a gaming state, fraudulence, and the like reliably for each of the stations.

BRIEF DESCRIPTION OF THE DRAWINGS

FIG. 6 is a block diagram showing a configuration of a game control means 15A of a control unit 15 that executes a card game;

FIG. 8 is a flowchart showing an example of monitoring and determination processing of a CPU that monitors a balance status of a gaming machine and determines fraudulence or an error in a game;

FIG. 6A is a block diagram showing a configuration of a game control means 15A of a control unit 15 that executes a card game;

DETAILED DESCRIPTION OF THE INVENTION

In the following, an example of a configuration of a gaming machine according to the present invention (a first embodiment) is described in detail.

Figure 1:
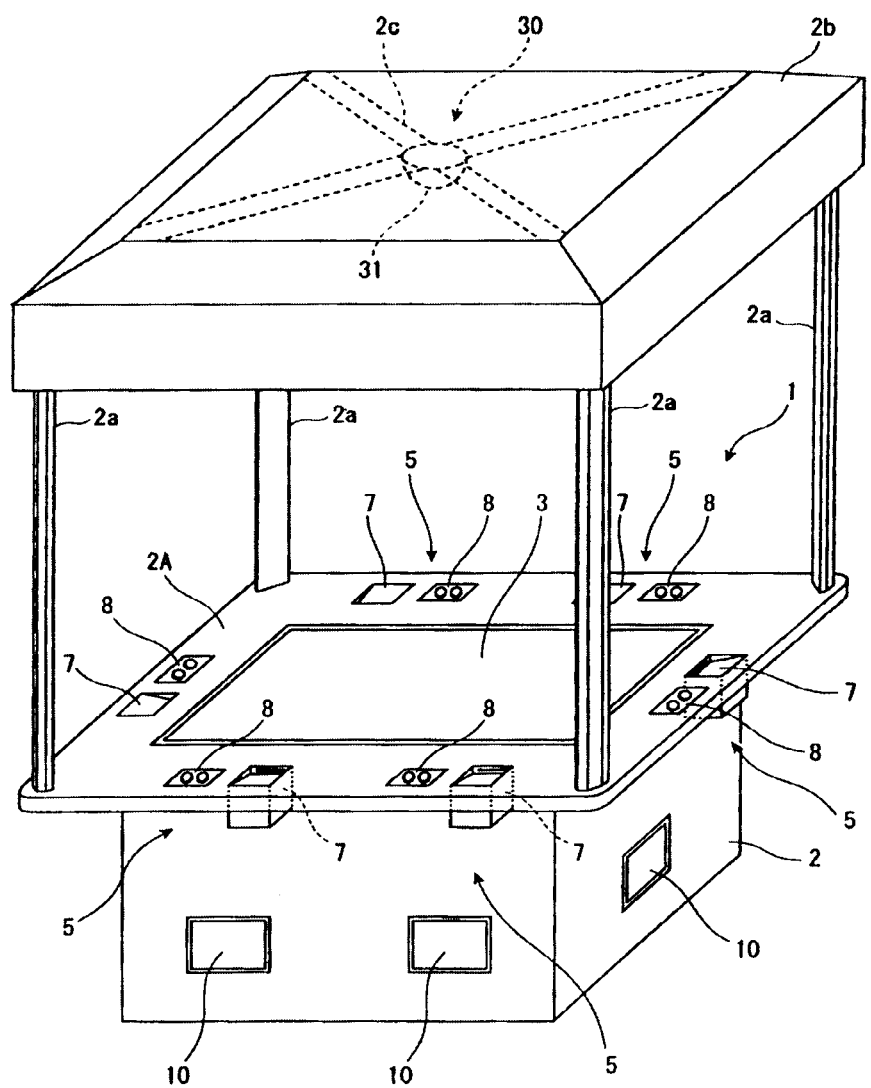
FIG. 1 is a perspective view of an entire configuration of an embodiment of a gaming machine.
Figure 2:
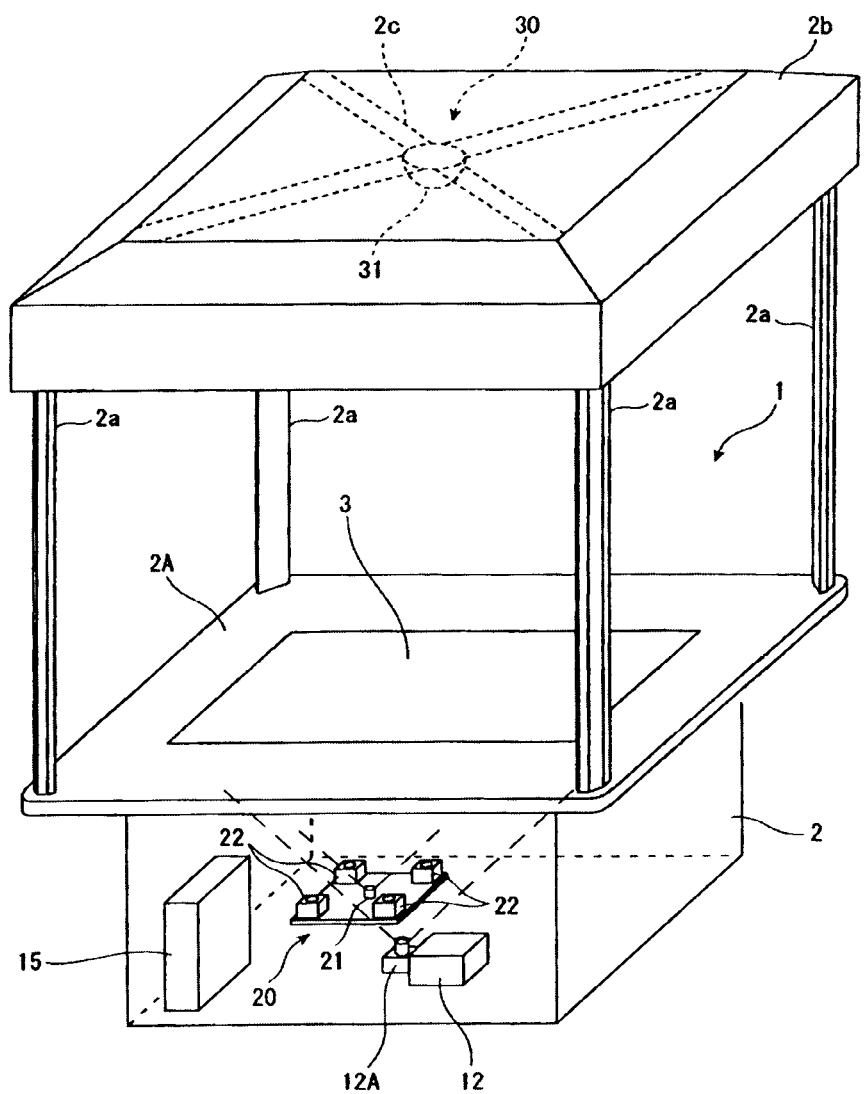
FIG. 2 is a schematic view of an internal configuration of a gaming machine.
Figure 3:
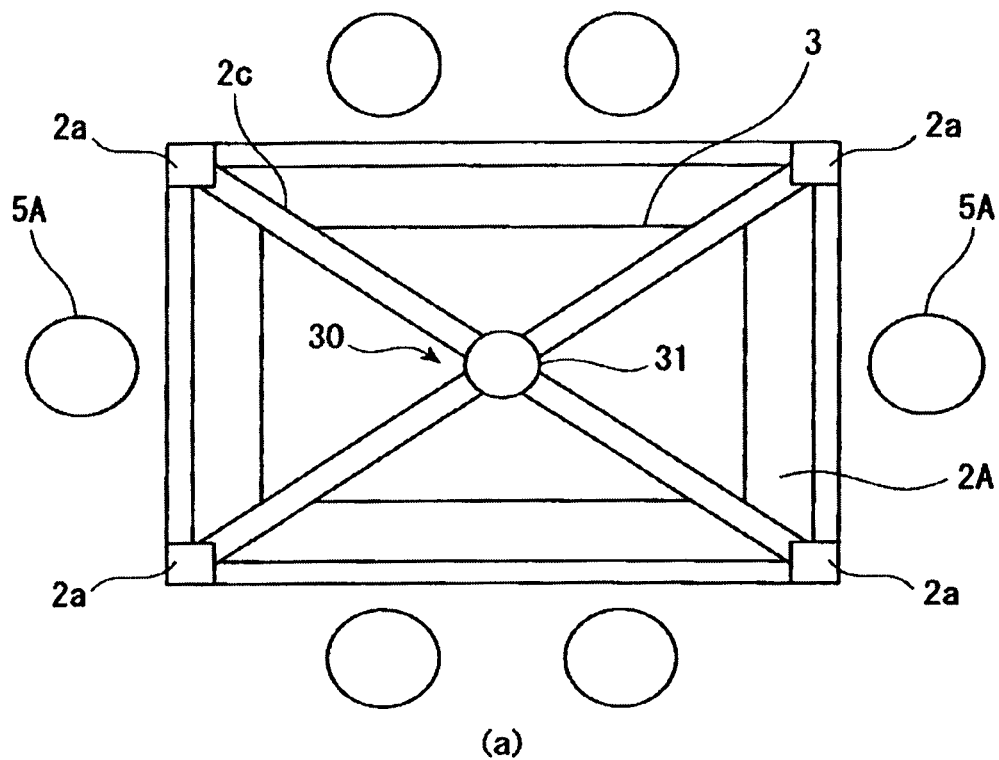
FIG. 3 shows a location of an image capturing means and, more specifically, FIG. 3(*a*) shows the image capturing means being disposed at a central location and FIG. 3(*b*) shows a modified example of a location of the image capturing means.
Figure 3:
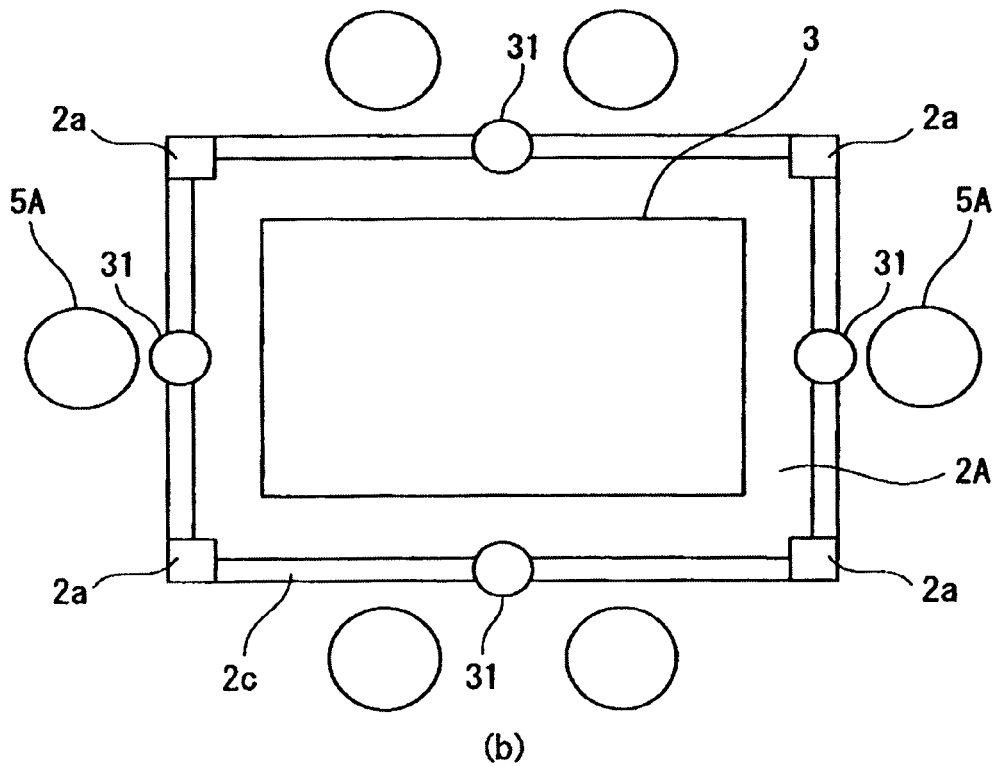
Figure 3A:
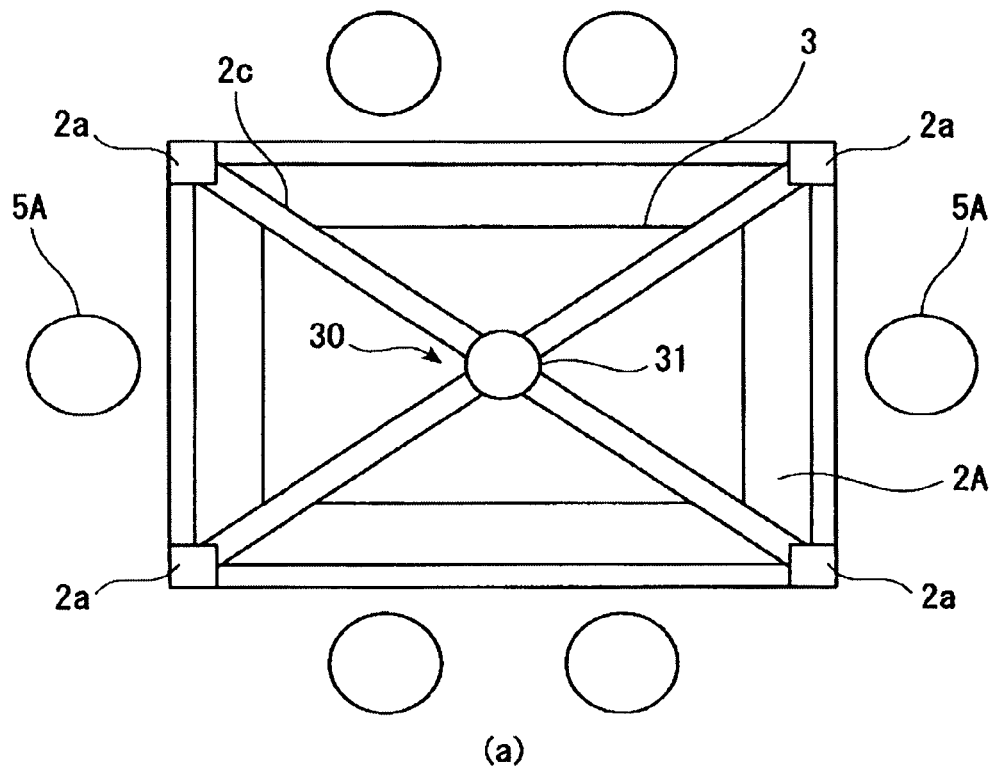
FIG. 3A shows a location of an image capturing means and, more specifically, FIG. 3A(a) shows the image capturing means being disposed at a central location and FIG. 3A(b) shows a modified example of a location of the image capturing means.
Figure 3A:
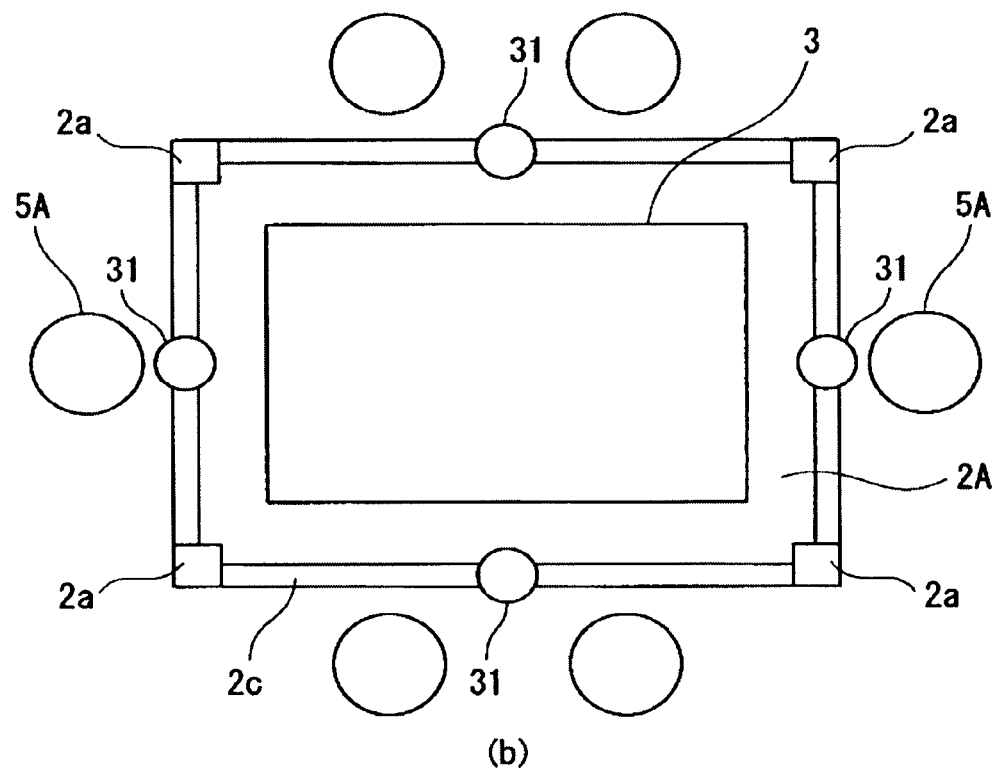
Figure 3B:
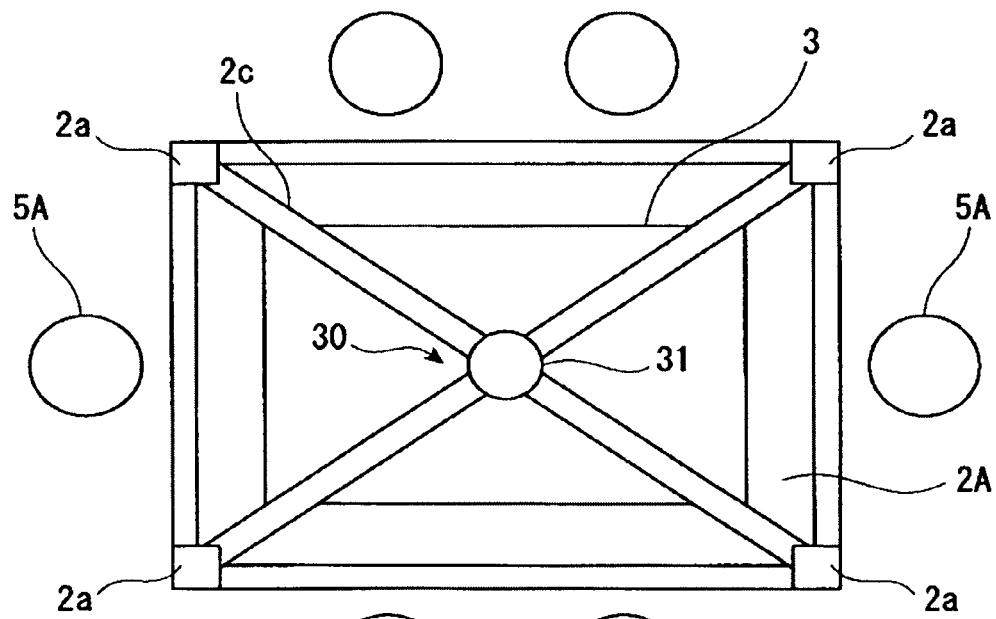
FIG. 3B shows a location of an image capturing means and, more specifically, FIG. 3B(a) shows the image capturing means being disposed at a central location and FIG. 3B(b) shows a modified example of a location of the image capturing means.
Figure 3B:
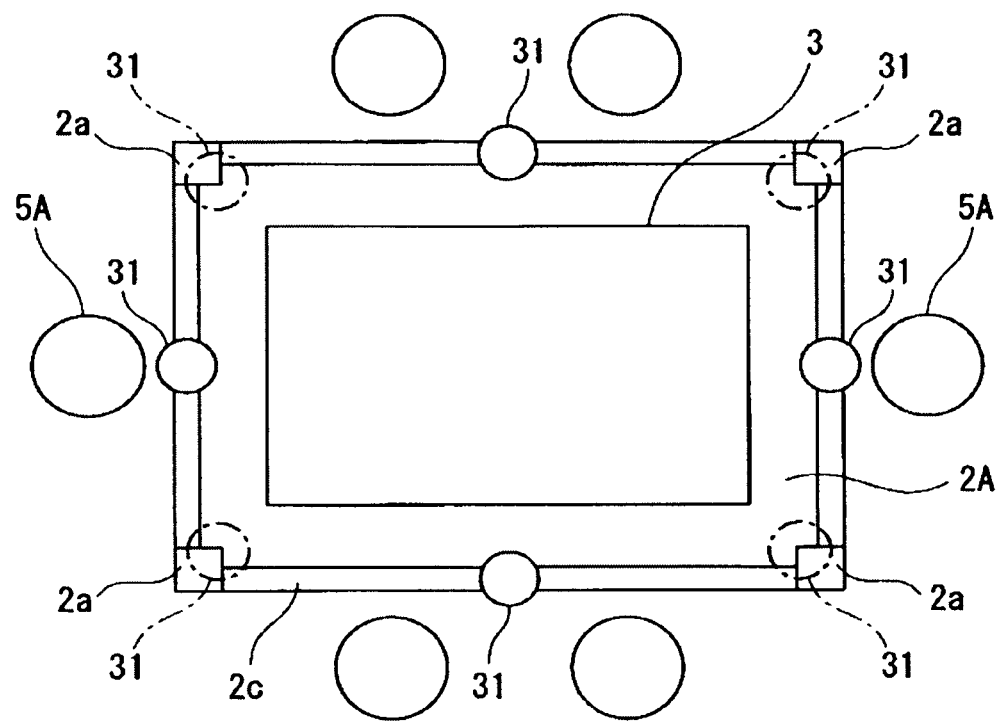
Figure 4:
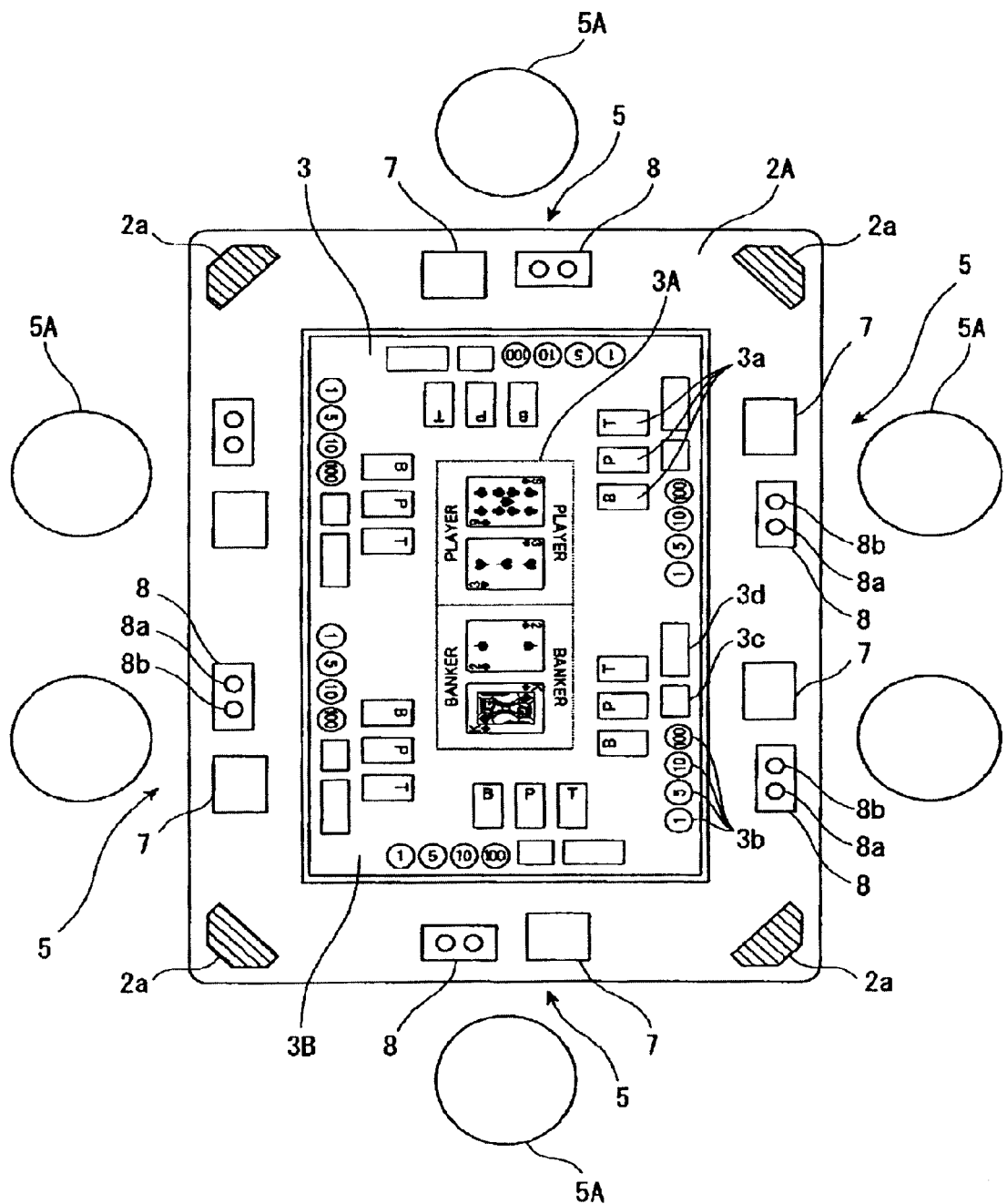
FIG. 4 shows an example of a game performed on an image display unit.

FIG. 1 is a perspective view of an overall configuration of an embodiment of a gaming machine. FIG. 2 is a schematic view of an internal configuration of a gaming machine. FIG. 3 shows a location of an image capturing means and, more specifically, FIG. 3(*a*) shows the image capturing means being disposed at a central location and FIG. 3(b) shows a modified example of a location of the image capturing means. FIG. 4 shows an example of a game performed on an image display unit.

Figure 10:
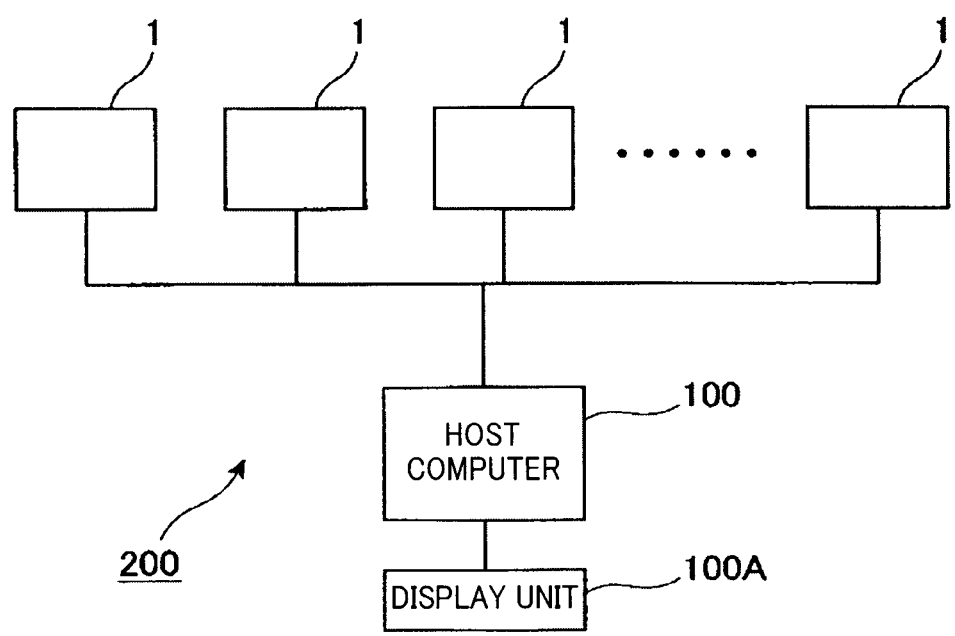
FIG. 10 is a schematic diagram of a configuration of a gaming management system.

A gaming machine 1 of the present embodiment is configured so that an image display unit 3 is provided on an upper face (a table 2A) of a table-shaped housing 2 and six stations 5 are provided so that six players can play a game therearound. In an amusement facility where a plurality of the gaming machines 1 are installed, a game management system 200 is configured by connecting each of the gaming machines 1 to a host computer 100 together, which configures an external apparatus as described later, as shown in FIG. 10.

A chair 5A is provided at each of the stations of the gaming machines 1. Thus, players seated at each of the stations 5 can participate in various games such as a card game, roulette game, a dice game, and the like, executed at the center of the image display unit 3. The players can participate in a game executed at the center of the display and receive payouts at the end of a game by using gaming media such as medals, coins, paper money, a prepaid card, and the like.

As described above, a game is advanced by way of a control unit provided in the housing 2 and an image projecting means controlled by the control unit. This control unit not only advances a game, but also executes receiving a bet operation by a player at each of the stations and performs paying out of gaming media corresponding to a bet amount to a player when the player wins an award based on a result of the game.

The station 5 may be configured so as to allow the player to participate in a game and perform a bet operation, and includes at least the gaming media receiving unit 7 to which the gaming media is inserted when playing a game and a controller 8 including a plurality of control buttons to which a predetermined instruction is input by the player. It should be noted that, as shown in the drawings, although the controller 8 is provided at a table portion of the housing 2, it may be configured so that functions arising by way of operating a control button are realized through an operated image displayed on the image display unit 3, or conversely, that some of the operations through the image display unit are performed by the control button instead.

As shown in FIG. 4, in the present embodiment, a baccarat game, which is one type of card game, is performed in an image of the image display unit 3. More specifically, a playing area 3A in which cards distributed to "BANKER" and "PLAYER" are shown is provided in the central area of the image display unit 3, and an operation area 3B in which a bet operation can be performed through each of the stations 5 for a game executed in the playing area 3A is provided at the peripheral area of the image display unit 3.

The operation area 3B is one of the components of each of the stations 5. Hence, in the operation area 3B, it is configured that a bet operation screen, a help information screen, and the like are displayed on each of the stations 5. In FIG. 4, all of the stations 5 are set in a state in which the bet operation screens thereof are displayed, and the bet operation screens are configured to include a bet area 3a where a player at each of the stations places a bet on "BANKER", "PLAYER", or "DRAW", a chip display area 3b for displaying chips, a select operation area 3c for selecting a bet, and a credit information display area 3d for displaying information of remaining credits.

In this case, a player can perform a bet operation, for example, by pushing an amount of desired chips among "1", "5", "10", and "100" displayed in the chip display area 3b with a finger, and dragging thereof in the present state to a display area of "BANKER", "PLAYER", or "DRAW" in the bet area 3a, or alternatively, without dragging, by pushing, in the present state, any one of "BANKER", "PLAYER", or "DRAW" in the bet area 3a with a finger. Then, after the bet operation, the bet operation is fixed by way of pushing the select operation area 3c by finger. It should be noted that, regarding the abovementioned bet operation by a player, specific instructing locations are specified by a sensor unit 20 (described later) provide in the housing 2.

Then, after a game has ended, the amount of credits corresponding to the amount of chips bet is added to the amount of credits that a player currently possesses and the resulting amount of credits is displayed on the credit information display area 3d.

The gaming media receiving unit 7 is configured so that gaming media having a gaming value, such as medals, coins, paper money, a prepaid card, and the like, is inserted, and is provided at each of the station 5. The player can execute a game with the gaming media thus inserted, and the amount thereof is displayed on the credit information display area 3d.

The controller 8 is provided at each of the stations 5 and includes buttons that a player operates by pushing with progression of the game. These buttons include, for example, a cash-out button 8a, which is pushed at the end of a game, and a help button 8b.

The cash-out button 8a is generally pushed at the end of a game. When the cashout button 8a is pushed, the amount of credits corresponding to the amount of gaming media that a player has won in a game and currently possesses is paid out from a payout opening 10, which is provided on a side face of the housing 2. It should be noted that, in a case of inserting or paying out gaming media using a card, value information is overwritten by a reader/writer installed in the gaming media receiving unit 7, and then the card is ejected.

The help button 8b is a button which is pushed by a player when the player needs to know how to operate the game. Immediately after the help button 32 is pushed, a help screen showing various kinds of rules and operating information is displayed on the operation area 3B.

The image display unit 3 is configured with a member having transparency (a transparent screen) and so as to display light irradiated from a back side and, more specifically, a game image (a card image shown in FIG. 4) and an operation image (a bet image shown in FIG. 4) projected from the image projecting means 12 provided on the housing 2. In this case, the image projecting means 12 is configured by a known projector, and has a function of enlarging various images (motion pictures and still pictures) transmitted from the control unit 15 which controls the player's operation at each of the stations by using an image forming means 12 including a magnifier so as to form images on the image display unit 3.

The control unit 15 includes a function for controlling gaming image data and bet operation image data displayed on the image display unit 3 as an image control means, and a function for controlling progression of a game as well as various images displayed on the image display unit 3 as a game control means. This control unit 15 may be configured as a dedicated unit which is preliminarily installed in the housing 2 or may be configured in which a unit such as a personal computer (PC) storing data relating game procedures and various image data is incorporated in the housing 2. Furthermore, this control unit 15 may be configured so as to communicate various information with, for example, a host computer installed in an amusement facility, another gaming device, and the like, communication network such as internet, local area network, and the like.

In addition, a sensor unit 20 is provided in the housing 2 that specifically detects operations (in the present embodiment, locations instructed by a player's finger) by the player seated at each of the stations for advancing a card game.

This sensor unit 20 has a function of an operation detection means and includes a light emitting unit 21 that irradiates a scanning light toward the image display unit 3 and light receiving units (light receiving cameras 22) provided at four positions diagonally around the light emitting unit 21. Then, infrared light is configured to be irradiated from the light emitting unit 21 so as not to be affected by ambient visible light. Furthermore, reflected light from the object operated by the player on the surface of the image display unit 3 is detected by the light receiving camera 22. Then, the camera 22 is configured to detect an amount of light to be changed based on the operation by the player's finger and process the detected signal so as to specify a specific operating location of each of the players.

It should be noted that, by providing a plurality (four) of the light receiving cameras 22, even in a case in which a plurality of the players acts simultaneously, it is possible to specify exact locations for multi-point operating locations based on information relating to an angle of the object (a finger) detected at each camera. In other words, since information relating to an angle of the object can be calculated from the four cameras 22, it is possible to exactly specify the operating locations operated by multi-point operation by combining information relating to an angle at each of the cameras based on a predetermined algorithm.

Furthermore, an image capturing means 30 for capturing an image displayed on the image display unit 3 and a player seated on the chair 5A is provided in the housing 2. This image capturing means 30 is configured with, for example, a CCD camera, and image data thus photographed is converted into electric signals so as to be used for various confirmation processing, verification processing, and the like by, for example, comparing thereof with a reference image with respect to, for example, the presence of a player, operating status of a player, and display status on the image display unit.

In the present embodiment, vertical supporting members 2a are fixed at each corner of the table 2A on the housing 2 and decorative top boards 2b are provided to be substantially parallel with the table 2A at the top of the supporting members 2a, and then frames 2c are provided inside the top boards 2b and a CCD camera 31 configuring the image capturing means is provided. More specifically, the frames 2c provided inside the top boards 2b are, as shown in FIG. 3(*a*), bridged laterally along the diagonal lines, and the CCD camera 31 is provided above the location corresponding to the center of the image display unit 3.

For example, the CCD camera 31 is configured with a so-called dome camera that is housed in a dome-shaped housing fixed by the frames 2c, and can capture images of predetermined directions (each of the stations 5 and the image display unit 3) periodically by way of a rotating mechanism, tilt mechanism, and the like. Therefore, the CCD camera 31 can capture various images displayed on the image display unit 3 as well as all the players seated at the table 5A.

In addition, the configuration of the CCD camera 31, a mode of installation, an interval of image capturing, and the like, can be modified as appropriate, depending on a method of using the images. For example, as shown in FIG. 3(*b*), a rectangular frame 2c is provided in the top board 2b, and then each of the CCD cameras 31 can be provided in a direction facing each of the stations 5. As shown in FIG. 3(*b*), the CCD camera provided in the direction facing each of the stations 5 may photograph a single player by a single CCD camera or may photograph a plurality of players by a single CCD camera. With such a configuration, it is possible to photograph a facial expression of a player as well as the presence of a player. Therefore, it is possible to utilize image data thus photographed for, for example, face-recognition processing.

In addition, it is preferable for the above-mentioned image capturing means to be provided so as not to be visually recognized by a player seated at a chair. For example, by forming an opening which is allowed to expose a lens portion solely so as to provide the CCD camera 31, it is possible to capture a necessary image without the player recognizing the camera.

Furthermore, in the housing 2, a speaker for playing music, sound effects, and the like, various lamps, and the like may be provided in addition to the abovementioned image capturing means.

Next, a control system of the gaming machine 1 thus configured as described above is explained with reference to FIGS. 5 to 7.

Figure 5:
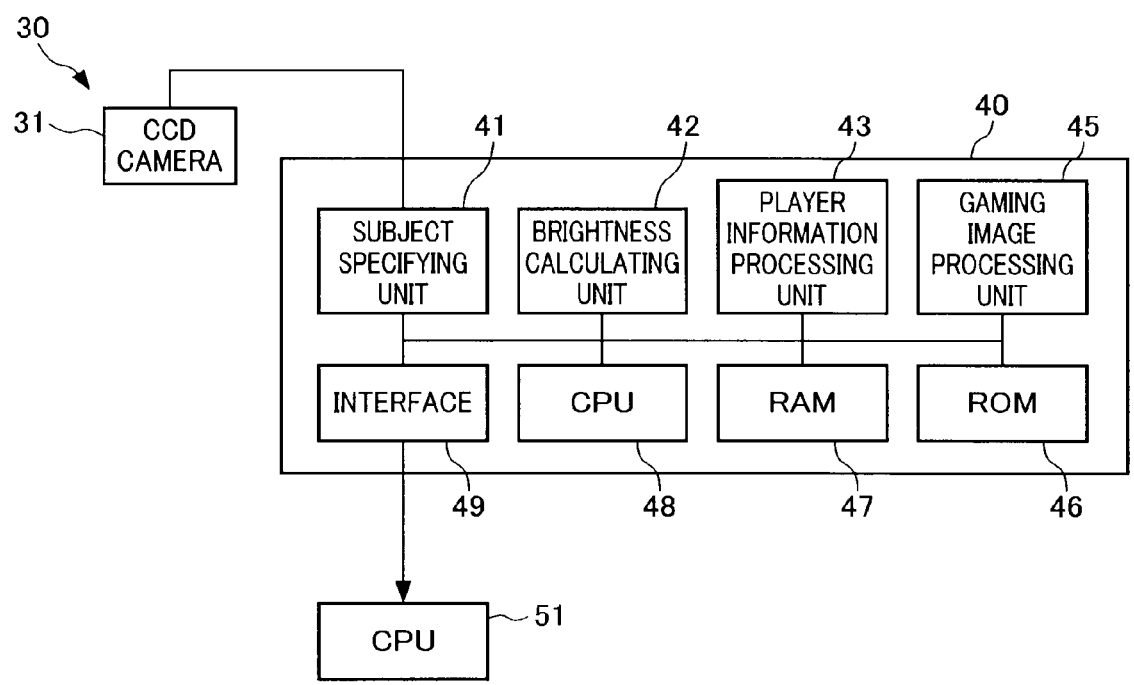
FIG. 5 is a block diagram showing a schematic configuration of an image processing system for processing an image captured by an image capturing means.

FIG. 5 is a block diagram showing a schematic configuration of an image processing system for processing images photographed by the abovementioned image capturing means 30. As described above, the image capturing means 30 includes an image display unit 3 and a CCD camera (image capturing device) 31 that can photograph a player, and image capturing signals from the CCD camera 31 are processed by an image processing circuit (image processing means) 40.

The image processing circuit 40 includes: a subject specifying unit 41 that receives photographed signals from the CCD camera and specifies a subject; a brightness calculating unit 42 for converting each pixel of a photographed image of a subject specified by the subject specifying unit 41 into brightness information; a player information processing unit 43 that processes information relating to a player (presence or absence of the player, information relating to operations of the player, facial information, information relating to operations of the player made with the lapse of time, and the like) at each of the stations based on the brightness information calculated by the brightness information calculating unit 42; a gaming image processing unit 45 that processes information relating to a gaming image (such as contents of a gaming image, contents of a bet image, and location information thereof) displayed on the image display unit 3 based on the brightness information calculated by the brightness information calculating unit 42; ROM 46 in which an operation program, reference data to be compared with comparative criteria, masked data for masking unnecessary background images, and the like are stored; RAM 47 having a function of temporarily storing a running program, processed image data, and the like; and a CPU 48 that controls those units. These units are connected with each other via a bus and each of the units is configured to be controlled by the control CPU 48.

More specifically, regarding the image capturing signal photographed by the CCD camera 31, by specifying image information at the subject specifying unit 41 and, for example, by obtaining edge information at the player information processing unit 43, processing data as to whether a player is seated on the chair 5A at one of the stations 5 and data relating to an instructing location that a player operated by hand. Furthermore, based on the image information thus specified, gaming image data (such as image content displayed and displaying location) displayed on the image display unit 3 can be processed at the gaming image processing unit 45.

Furthermore, various processing can be executed by converting the image information thus specified into data including brightness information for each pixel thereof at the brightness calculating unit 42. For example, in the player information processing unit 43, it is possible to obtain data relating to trends in a player's movement by detecting continuity regarding a portion in which differences of the brightness information are continued more than a predetermined threshold based on the photographed image photographed at every predetermined interval, or obtain data relating to identity verification by photographing a face of the player and comparing thereof with a reference image (reference data) stored preliminarily so as to use a correlation therebetween. It should be noted that, in a case in which images are photographed continuously, an image photographed at a prescribed point in time, an image stored in ROM preliminarily, or an image transmitted from another apparatus (such as a host computer) may be used as reference data.

In addition, by deleting an unnecessary background of the image capturing signal photographed by the CCD camera 31 or superimposing masked data stored in the ROM 46 in a case in which displayed contents on the image display unit 3 cannot be identified specifically, it is possible to obtain only an image of the table portion and an image of the player operating at the table. It is also possible to obtain image data (see FIG. 9) that specifies a location of a player present at the station 5 and display contents of the image display unit 3 by transmitting the image data to a main control CPU 51 (described later) and actually combining thereof with image data displayed on the image display unit.

Then, the data relating to the processed image thus obtained is stored in the RAM 47 and transmitted to the main control CPU 51 in the game control means 15A that executes the following card game via an interface 49.

FIG. 6 is a block diagram showing a configuration of the game control means 15A of the control unit 15 that executes a card game.

The game control means 15A includes a main control CPU 51, ROM 52, and a microcomputer which is configured with a bus 54 as a core for transferring data mutually therebetween. Then, the CPU 51 is connected, via an I/O interface 57, with: the image processing circuit 40 that processes an image in which a player seated at each of the stations 5 and displayed contents on the image display unit 3 are photographed; an image control driving circuit 60 that controls various images displayed on the image display unit 3; and an operating location detecting circuit 61 that receives a detected signal from the sensor unit 20, which detects an operating location of a finger (object) of a player seated at each of the stations 5, and specifies the operating location of each of the players specifically; and the like.

The main control CPU 51 of the game control means 15A communicates various data such as bet information, award information, and the like, between each of the stations 5 via the I/O interface 57 and a communication interface 63, and has a function for mainly controlling each of the stations 5 and advancing a game. More specifically, the main CPU 51 specifies bet operation information made at each of the stations 5 through the operating location detecting circuit 61, and then accepts the bet information, executes win determination processing with respect to the chips bet, and calculates the amount of credits that is paid out at each of the stations 5 with reference to a payout table.

Furthermore, the ROM 52 in the game control means 15A is configured with, for example, solid-state memory, and stored therein are a program for realizing a basic function for advancing a baccarat game, a display operation program for controlling various image contents displayed on the image display unit 3 with a progression of a game, a program for receiving and paying out game media and the like, a payout table referred to for executing a baccarat game, and the like.

The RAM 53 is memory for temporarily storing various data computed by the CPU 51, and temporarily stores, for example, information relating to a player's operation (such as bet operating location and an amount of bet) through the controller at each of the stations 5 and an operating screen, information relating to an operating location specified by the operating location detecting circuit 61 for each of the stations 5, image capturing data photographed by the CCD camera 31 which is processed in the image processing circuit 40, data relating to a result of the processing executed by the CPU 51, and the like.

Then, the main control CPU 51 in the game control means 15A executes control processing with a progression of a game, such as control of various driving circuits and displayed images on the image display unit 3.

The image control driving circuit 60 is configured to include program ROM, image ROM, an image control CPU, work RAM, a VDP (video display processor), video RAM, and the like. The image control program and the like, relating to a display of the image display unit 3, is stored in the program ROM, and various image data (pixel data) for forming an image displayed on the image display unit 3 is stored in the image ROM.

In addition, the image control CPU determines an image to be displayed on the image display unit 3 (projector 12) among pixel data stored in the image ROM according to the image control program stored in the program ROM preliminarily based on the parameters set by the CPU 51. Thus, a specific displaying location of a game image (card image) and an operating image (bet image) as shown in FIG. 4, timing for displaying an image with a progression of a game, and the like are controlled by the CPU 51.

In addition, the work RAM is configured as a temporary storage means for when the image control program is executed by the image control CPU, and the VDP forms an image corresponding to displayed contents determined by the image control CPU and projects thereof on the image display unit 3 via the projector 12.

The operating location detecting circuit 61 includes a CPU and the like that executes predetermined computing and has a function of specifying a location of an object (a finger of a player) present at the surface of the image display unit 3 specifically. More specifically, the operating location detecting circuit 61 receives a detected signal from the four cameras 22 of the sensor unit 20 provided in the housing 2 and has a function of specifying a portion where a player actually operated (a specific location instructed by a finger of the player) on the image display unit 3. In this case, the operating location detecting circuit 60 derives angular information of the object thus detected based on detected locations inputted from each of the four cameras 22, and has a function of specifying a location of the finger pointing on the image display unit 3. By using the four cameras 22, it is possible to specify the location exactly based on detection information obtained from each of the cameras, even if a player seated at each of the stations 5 executes instructing operations simultaneously.

Furthermore, the CPU 51 includes an identification processing function for identifying whether a player's operation matches location information obtained at the operating location detecting circuit 61 based on information relating to an operating location of a player which is obtained from the operating location detecting circuit 61 and an operating image of the player which is obtained from the image processing circuit 40.

Moreover, the CPU 51 can communicate information with an external device 100 such as a host computer via the communication interface 63. In this case, it can be assumed that, for example, information relating to operating states of a gaming machine of interest for every prescribed time interval, information relating to payout rates of the gaming media at each of the stations, verification information of players seated at the stations, and the like are transmitted to the external device 100. In addition, it can be assumed that reference image data such as facial information of a player present at an amusement facility, ID information of a card that each of the players possesses, and the like are transmitted from the external device.

Next, a configuration according to a control system of the station 5 connected with the CPU 31 is described.

Figure 7:
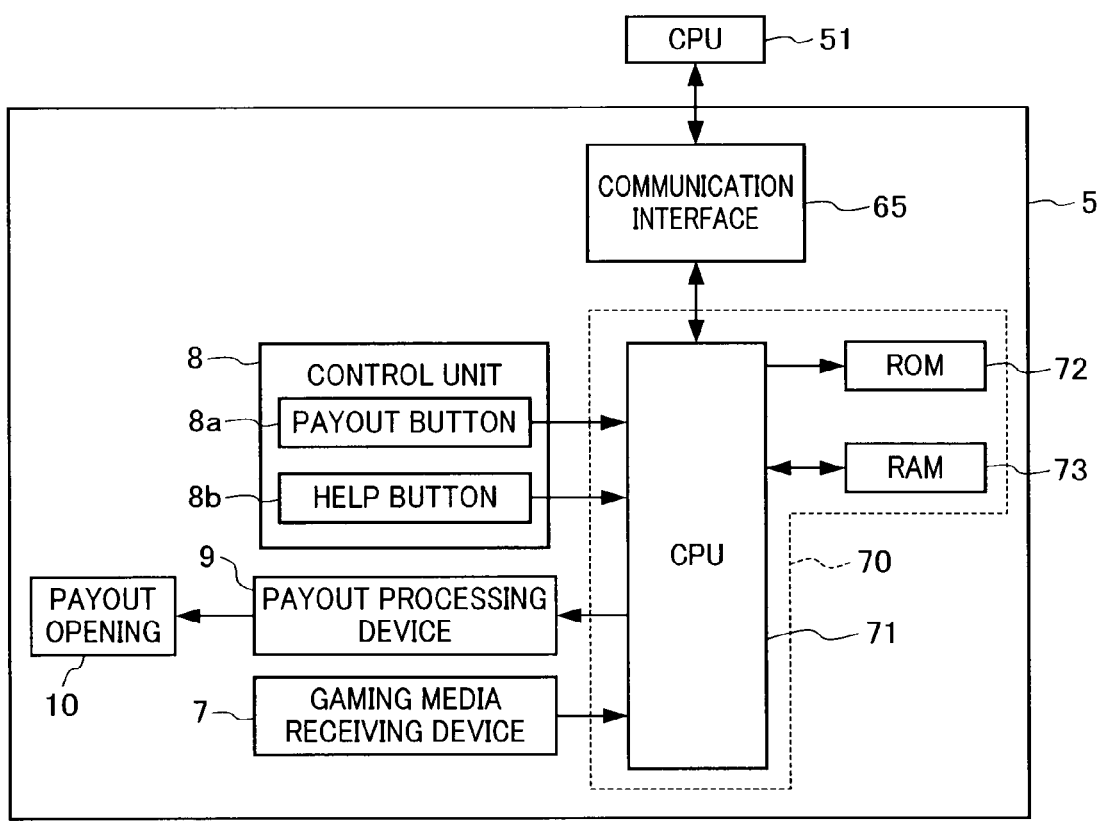
FIG. 7 is a block diagram showing a control system at each of the stations.

FIG. 7 is a block diagram schematically showing a control system of a station 5 according to the present embodiment. The station 5 includes a player-used controller 70 for controlling an operation at the station and the abovementioned peripheral apparatuses (such as the gaming media receiving device 7, the controller 8, and a payout processing device 9).

The player-used controller 70 includes a CPU 71, ROM 72, and RAM 73 for controlling the station and communicates data with the main control CPU 51 in the abovementioned game control means 15A via a communication interface 65.

The ROM 72 is configured with, for example, solid-state memory, and in the station 5, a program for realizing a basic function, various programs necessary for controlling thereof at another station, and the like, are stored.

The RAM 73 is memory for temporarily storing various data computed by the CPU 71, an amount of credits that a player currently possesses, a bet status of chips by the player, and the like.

Furthermore, a payout button 8a and a help button 8b, which are provided at the controller 8 (see FIG. 1), are connected to the CPU 71, respectively, and the CPU 71 controls execution of various corresponding operations based on operational signals outputted such as by pushing each button. Then, an input signal by the player's operation is transmitted to the main control CPU 51.

In addition, a payout processing device 9 is connected to the CPU 71, and it is possible to pay out gaming media such as medals from the payout opening 10 based on a payout instruction signal from the CPU 71. Moreover, the gaming media receiving device 7 to which the gaming media such as coils, medals, and the like is connected to the CPU 71. The gaming value information (credit information) transmitted from the gaming media receiving device 7 is stored in the RAM 73. Then, the payout information from the payout processing device 9 and the gaming value information (credit information) transmitted from the gaming media receiving device 7 are transmitted to the CPU 51 as balance status information with respect to the gaming machine 1.

The gaming machine 1 with this configuration is configured so as to monitor the overall balance status of the gaming machine 1 by the CPU 51 based on the above-mentioned balance information transmitted from each of the stations 5 (in this sense, the CPU 51 has a function as an earning and expense state monitoring means). Here, the balance state indicates a balance of a gaming value in relation to an amount of a gaming value paid out to a player according to a game result compared with a gaming value paid for a game by way of a bet operation. In addition, the CPU 51 of the gaming machine 1 can determine fraudulence or an error of a game by comparing such a balance status with a running state of the gaming machine 1 (in this sense, the CPU 51 has a function as a determination means for determining fraudulence or an error in a game). Here, an operating state indicates an operational state of the gaming machine 1 based on operating signals from the operating location detecting circuit 60, the image processing circuit 40, each of the stations, and the like, more specifically, a detecting signal from the sensor unit 20 which is an operation detection means, a image capturing signal from the image capturing means 30 (the CCD camera 31), an operation input signal from each of the stations 20 (running information), and the like.

FIG. 8 is a flowchart showing an example of monitoring and determination processing by the CPU 51 that monitors a balance status of the gaming machine 1 and determines fraudulence or an error in a game. It should be noted that the monitoring and determination processing is executed so as to be interrupted for a prescribed time interval after the gaming machine 1 starts running, and then a prescribed time lapses.

Figure 9:
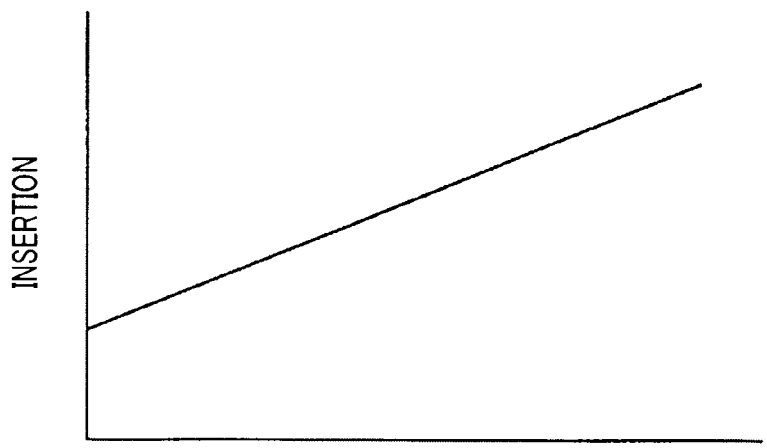
FIG. 9 is a graph showing an example of a data configuration used for determining a balance status.
Figure 9:
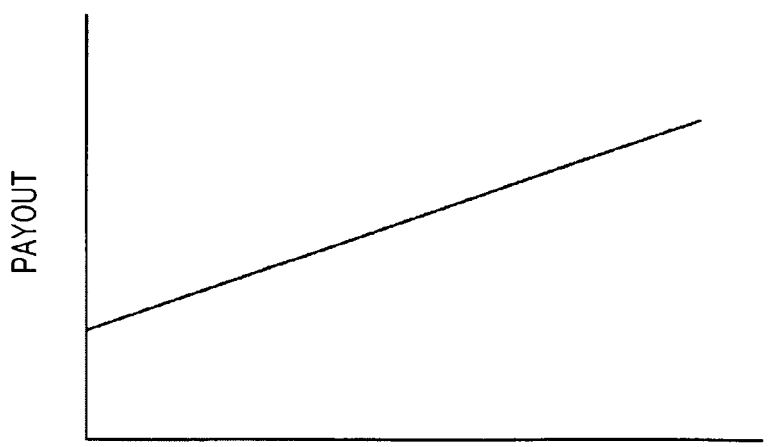
Figure 9:
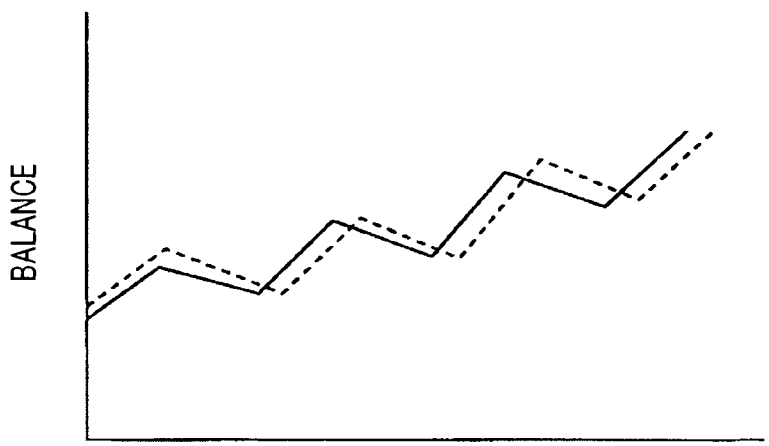
Figure 9A:
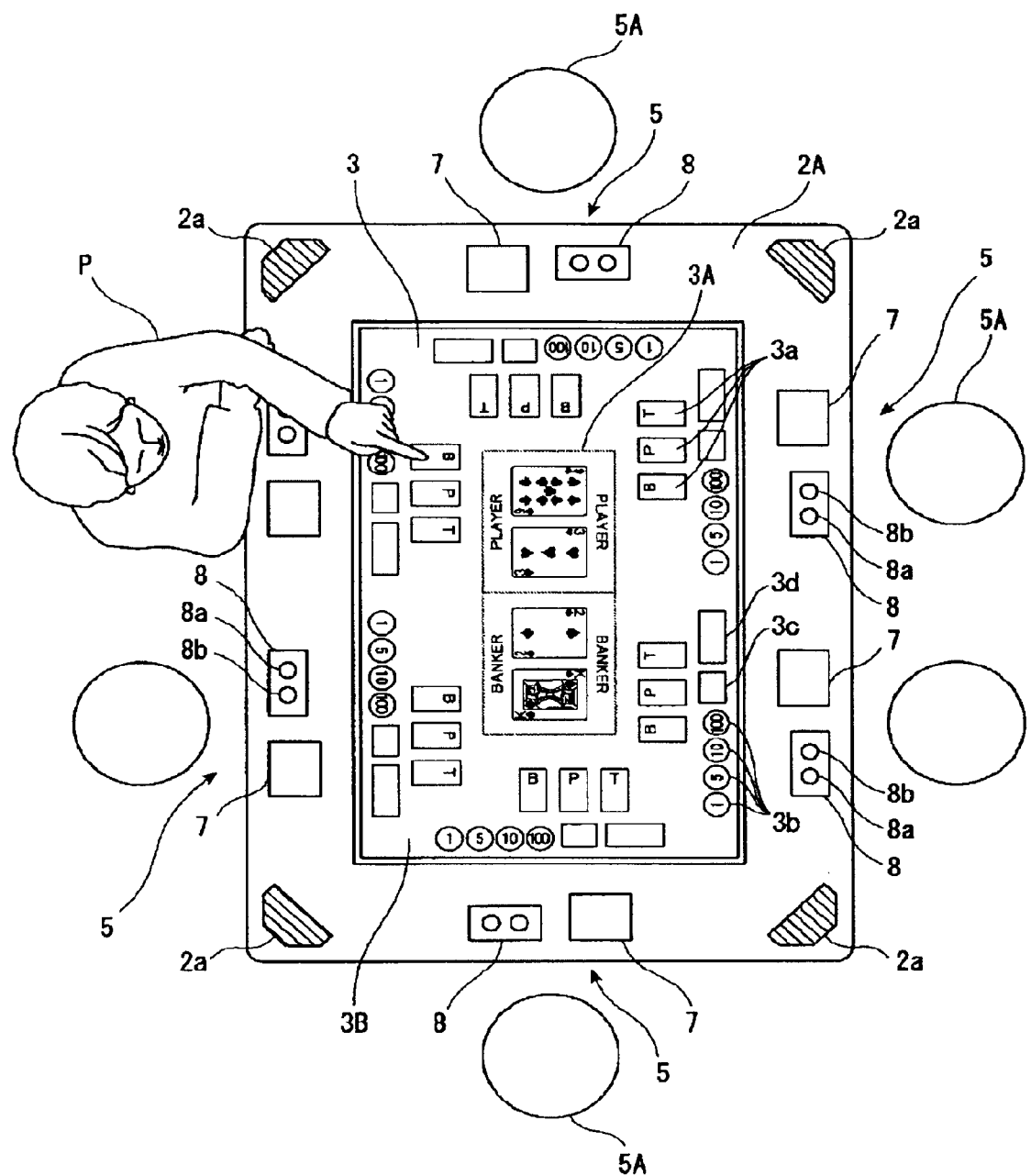
FIG. 9A is a diagram showing an operational state of a player photographed by a CCD camera.

As shown in the drawing, the CPU 51 initially obtains the abovementioned operation information (Step S1), and subsequently obtains the abovementioned balance status information (Step S2). Then, the CPU 51 compares the operation information thus obtained with the balance status information thus obtained (Step S3). At this time, this information is recognized as data shown in FIG. 9, for example, in the CPU 51, and the CPU 51 determines a balance status based on these data. In the examples of data configuration shown in FIG. 9, an insertion state of gaming media generates a graph with an upward line from left to right as shown in FIG. 9(a), a payout state of gaming media (based on a payout state from the payout processing device 9) generates a graph with an upward line from left to right as shown in FIG. 9(b), and a balance status forms the shape of the graph shown in FIG. 9(c).

The CPU 51 finally determines whether there is an irregularity in the balance status information based on comparison between the balance statuses (Step S4). Then, in the determination, for example, in a case in which the balance status data thus obtained (a data line shown as a solid line in FIG. 9(c)) is deviated from an balance transitional line (shown as a dashed line in FIG. 9(c)) as a criterion (in a case in which the determination in Step S4 is a YES determination), the CPU 51 determines that there is an irregularity in the balance status information, i.e. the CPU 51 recognizes that there is fraudulence or an error, and then notifies thereof (Step S5). Furthermore, in a case in which the determination in Step S4 is a NO determination, the CPU 51 continues the monitoring state in which the game is monitored without notification. It should be noted that the notification may be executed in the form of a sound and visual display using a speaker, a lamp, and the like as a notification means which configures the external device 100, or alternatively, the information regarding the notification may be transmitted to the external device 100 such as a host computer.

Furthermore, the abovementioned monitoring and determination processing may be executed at the host computer (see FIG. 10) as an external device that collectively controls all the gaming machine 1. That is, the host computer 100 executes the same process flow as that of the flowchart in FIG. 8, which is described based on the running information and the balance status information transmitted from the CPU 51 of each of the gaming machines 1. In this case, a management party of the amusement facility can know the balance status, for example, up until 50 hours ago (or more before it), in the form of the display mode shown in FIG. 9, via the display device 100A connected to the host computer 100.

As described above, according to the gaming machine 1 of the present embodiment, since a balance status of gaming media can be monitored by the CPU 51 as the balance status monitoring means, even though there is no observer such as a dealer who advances, manages, and monitors a game or it is difficult to confirm every action of all the players even, if there is an observer, the present invention can effectively prevent fraudulence which may otherwise affect a balance status of a gaming machine. Moreover, in the present configuration, since an operating state is recognized based on a bet operation by a player and a live image of the player by using the sensor unit 20 as the operation detection means and the image capturing means, respectively, and then, the operating state is compared with a balance status, it is easy to determine fraudulence or an error in a game, which can effectively prevent fraudulence reliably and effectively which may otherwise affect a balance status of a gaming machine.

Furthermore, in the present embodiment, in a case in which a game is determined to have fraudulence or an error, the CPU 51 notifies thereof. Therefore, the fraudulence or error of the game can be easily recognized.

Furthermore, according to the gaming management system 200 of the present embodiment, a balance status of gaming values at a plurality of the gaming machines 1 can be collectively monitored at the host computer 100, even though there is no observer such as a dealer who advances, manages, and monitors a game at each of the gaming machines 1 or it is difficult to confirm every action of all the players, even if there is an observer, the present invention can effectively and collectively prevent fraudulence which may otherwise affect a balance status of a plurality of the gaming machines, i.e. the entire amusement facility.

Furthermore, according to the gaming management system 200 of the present embodiment, since a running state for each of the gaming machines 1 is recognized based on a bet operation by a player and a live image of the player by using the sensor unit 20 as the operation detection means and the image capturing means, respectively, and then, the operating state is compared with a balance status, it is easy to determine fraudulence or an error in a game, which can effectively prevent fraudulence reliably and effectively which may otherwise affect a balance status of the entire amusement facility.

Furthermore, according to the gaming management system 200 of the present embodiment, in a case in which a game is determined to have fraudulence or an error, the information regarding the determination is notified on the host computer side. Therefore, the fraudulence or error in the game can be easily and collectively recognized on, for example, a management party side of the amusement facility.

In the foregoing, although the gaming machines according to the present invention are described, the present invention is not limited thereto, and may have various modifications thereto.

For example, a configuration of the gaming machine and an object for specifying an operating location can be modified as appropriate. For example, the object is not limited thereto, and a configuration may be made which specifies a location of an operation item that a player handles. Furthermore, although the image display unit 3 is configured so as to project a game image by way of the projector provided in the housing 2, the present invention may be configured with a liquid crystal display and the like. Furthermore, a configuration of the station 5 in which a game is executed and an operation device may be modified as appropriate, depending on a game executed.

The descriptions regarding the first embodiment are provided above.

In the following, an example of a configuration of a gaming machine according to the present invention (a second example) is described in detail.

Figure 1A:
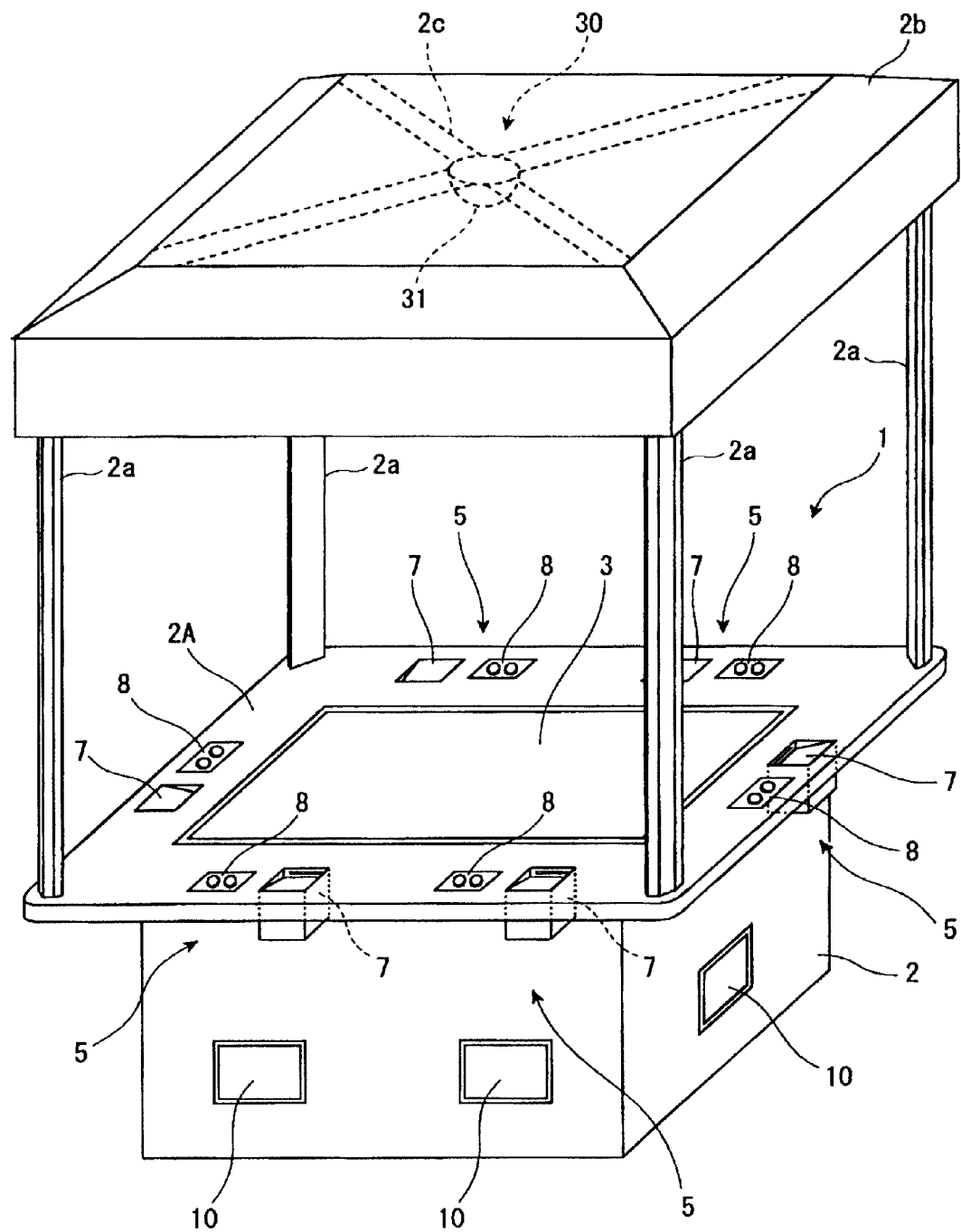
FIG. 1A is a perspective view of an overall configuration of an embodiment of a gaming machine.
Figure 2A:
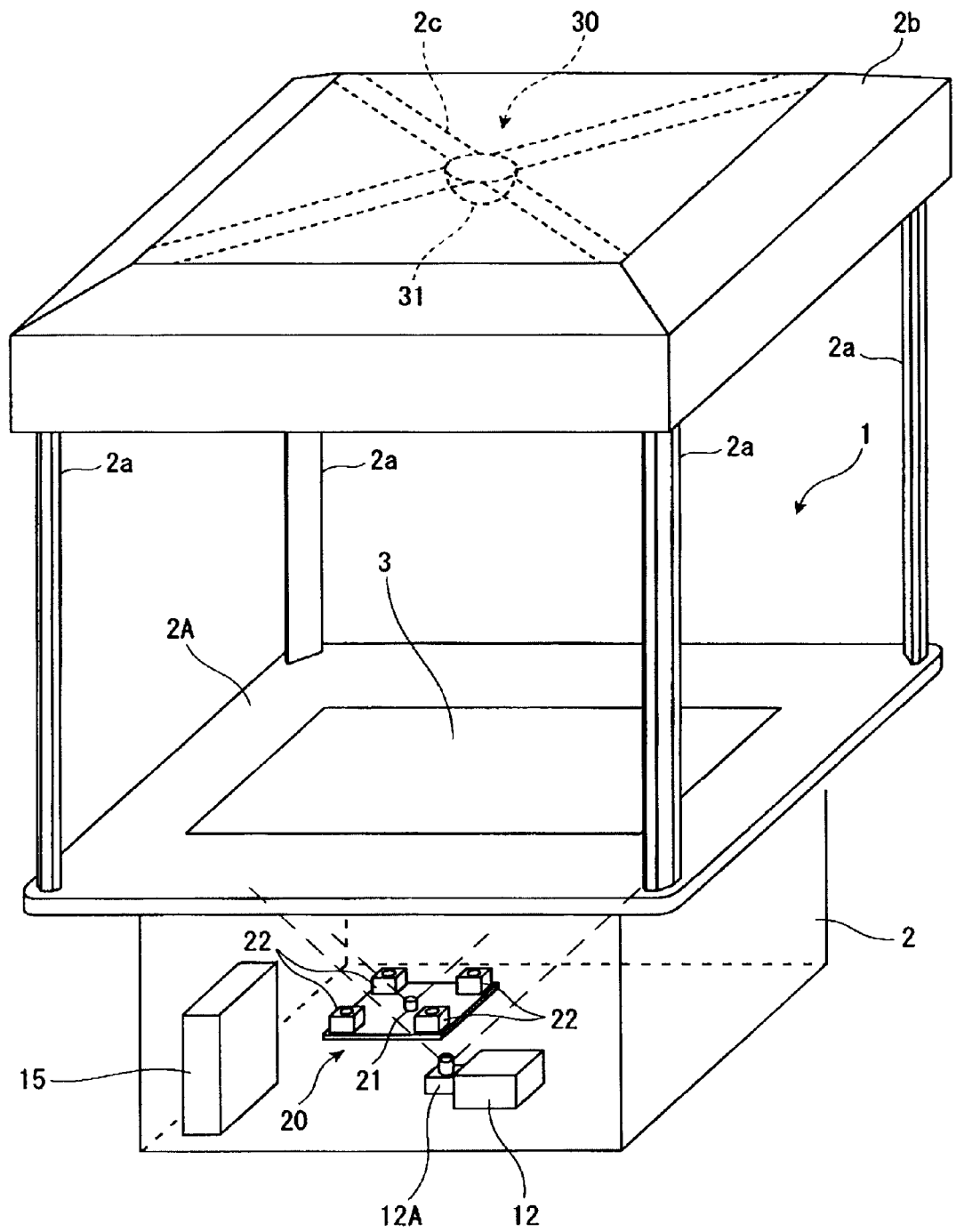
FIG. 2A is a schematic view of an internal configuration of a gaming machine.
Figure 4A:
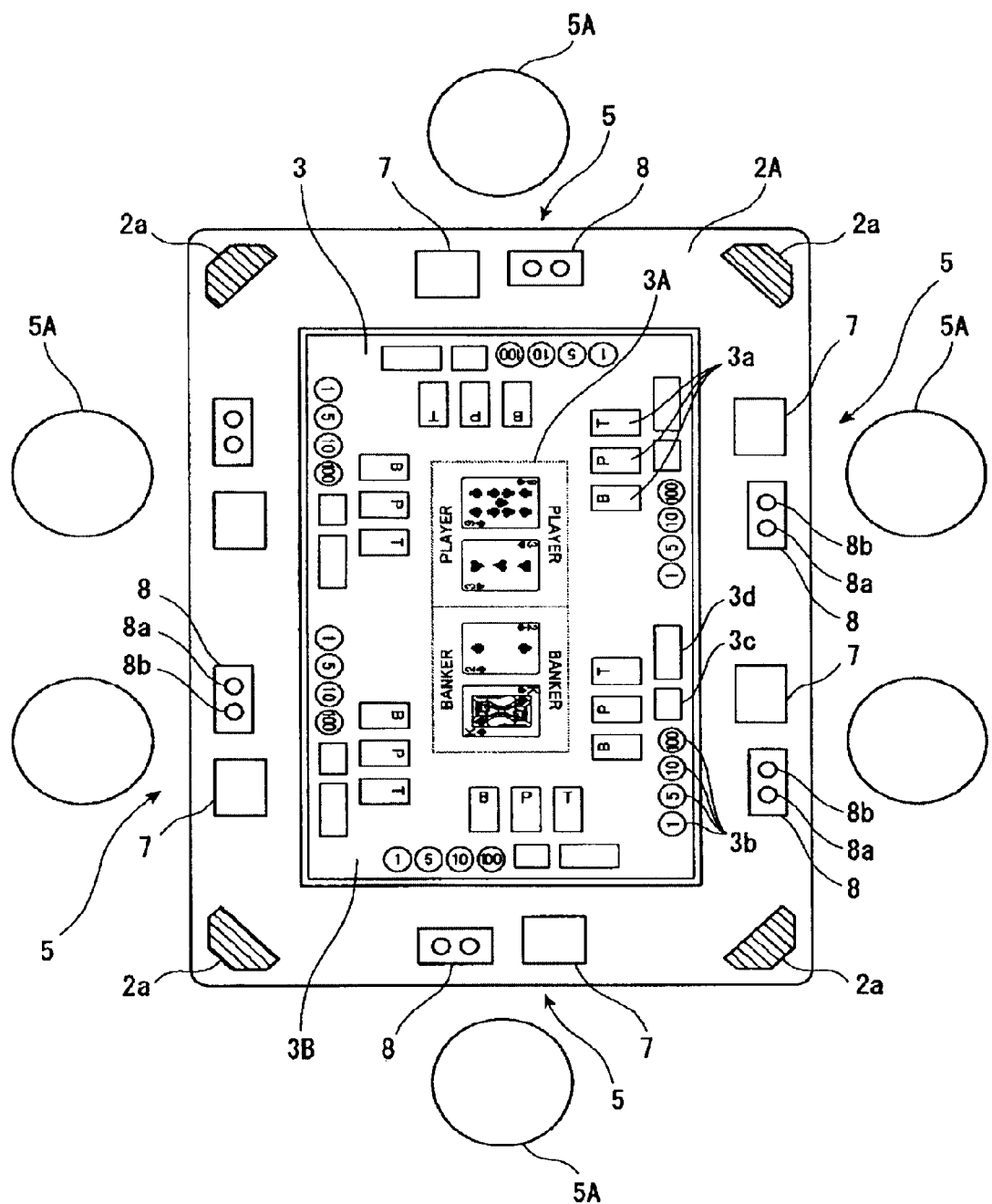
FIG. 4A shows an example of a game performed on an image display unit.

FIG. 1A is a perspective view of an overall configuration of an embodiment of a gaming machine. FIG. 2A is a schematic view of an internal configuration of a gaming machine. FIG. 3A shows a location of an image capturing means and, more specifically, FIG. 3A(a) shows the image capturing means being disposed at a central location and FIG. 3A(b) shows a modified example of a location of the image capturing means. FIG. 4A shows an example of a game performed on an image display unit.

A gaming machine 1 of the present embodiment is configured so that an image display unit 3 is provided on an upper face (a table 2A) of a table-shaped housing 2 and six stations 5 are provided so that six players can play a game therearound. A chair 5A is provided at each of the stations. Thus, players seated on each of the stations 5 can participate in various games such as a card game, roulette game, a dice game, and the like, executed at the center of the image display unit 3. The players can participate in a game executed at the center of the display and receive payouts at the end of a game by using gaming media such as medals, coins, paper money, a prepaid card, and the like.

As described above, a game is advanced by way of a control unit provided in the housing 2 and an image projecting means controlled by the control unit. This control unit not only advances a game, but also executes receiving a bet operation by a player at each of the stations and performs paying out of gaming media corresponding to a bet amount to a player when the player wins an award based on a result of the game.

The station 5 may be configured so as to allow the player to participate in a game and perform a bet operation, and includes at least the gaming media receiving unit 7 to which the gaming media is inserted when playing a game and a controller 8 including a plurality of control buttons to which a predetermined instruction is input by the player. It should be noted that, as shown in the drawings, although the controller 8 is provided at a table portion of the housing 2, it may be configured so that functions arising by way of operating a control button are realized through an operated image displayed on the image display unit 3, or conversely, that some of the operations through the image display unit are performed by the control button instead.

As shown in FIG. 4A, in the present embodiment, a baccarat game, which is one type of card game, is performed in an image of the image display unit 3. More specifically, a playing area 3A in which cards distributed to "BANKER" and "PLAYER" are shown is provided in the central area of the image display unit 3, and an operation area 3B in which a bet operation can be performed through each of the stations 5 can be performed for a game executed in the playing area 3A is provided at the peripheral area of the image display unit 3.

The operation area 3B is one of the components of each of the stations 5. Hence, in the operation area 3B, it is configured that a bet operation screen, a help information screen, and the like are displayed on each of the stations 5. In FIG. 4A, all of the stations 5 are set in a state in which the bet operation screens thereof are displayed, and the bet operation screens are configured to include a bet area 3a where a player at each of the stations places a bet on "BANKER", "PLAYER", or "DRAW", a chip display area 3b for displaying chips, a select operation area 3c for selecting a bet, and a credit information display area 3d for displaying information of remaining credits.

In this case, a player can perform a bet operation, for example, by pushing an amount of desired chips among "1", "5", "10", and "100" displayed in the chip display area 3b with a finger, and dragging thereof, in the present state, to a display area of "BANKER", "PLAYER", or "DRAW" in the bet area 3a, or alternatively, without dragging, by pushing any one of "BANKER", "PLAYER", or "DRAW" in the bet area 3a, in the present state, with a finger. Then, after the bet operation, the bet operation is fixed by way of pushing the select operation area 3c using a player's finger. It should be noted that, regarding the abovementioned bet operation by a player, specific instructing locations are specified by a sensor unit 20 (described later) provide in the housing 2.

Then, after a game has ended, the amount of credits corresponding to the amount of chips bet is added to the amount of credits that a player currently possesses and the resulting amount of credits is displayed on the credit information display area 3*d*.

The gaming media receiving unit 7 is configured so that gaming media having a gaming value, such as medals, coins, paper money, prepaid card, and the like, is inserted, and is provided at each of the station 5. The player can execute a game with the gaming media thus inserted, and the amount thereof is displayed on the credit information display area 3*d*.

The controller 8 is provided at each of the stations 5 and includes buttons that a player operates by pushing with a progression of the game. These buttons include, for example, a cash-out button 8*a*, which is pushed at the end of a game, and a help button 8*b*.

The cash-out button 8*a* is generally pushed at the end of a game. When the cashout button 8*a* is pushed, the amount of credits corresponding to the amount of gaming media that a player has won in a game and currently possesses is paid out from a payout opening 10, which is provided on a side face of the housing 2. It should be noted that, in a case of inserting or paying out gaming media using a card, value information is overwritten by a reader/writer installed in the gaming media receiving unit 7, and then the card is ejected.

The help button 8*b* is a button which is pushed by a player when the player needs to know how to operate the game. Immediately after the help button 32 is pushed, a help screen showing various kinds of rules and operating information is displayed on the operation area 3B.

The image display unit 3 is configured with a member having transparency (a transparent screen) so as to display light irradiated from a back side and, more specifically, a game image (a card image shown in FIG. 4A) and an operation image (a bet image shown in FIG. 4A) projected from the image projecting means 12 provided on the housing 2. In this case, the image projecting means 12 is configured by a known projector, and has a function of enlarging various images (motion pictures and still pictures) transmitted from the control unit 15 which controls the player's operation at each of the stations by using an image forming means 12 including a magnifier so as to form images on the image display unit 3.

The control unit 15 includes functions for controlling gaming image data and bet operation image data displayed on the image display unit 3 as an image control means and a function for controlling a progression of a game as well as various images displayed on the image display unit 3 as a game control means. This control unit may be configured as a dedicated unit which is preliminarily installed in the housing 2 or may be configured in which a unit such as a personal computer (PC) storing data relating game procedures and various image data is incorporated in the housing 2. Furthermore, this control unit 15 may be configured so as to communicate various information with, for example, a host computer installed in an amusement facility, another gaming device, and the like, communication network such as internet, local area network, and the like.

In addition, a sensor unit 20 is provided in the housing 2 that specifically detects operations (in the present embodiment, locations instructed by a player's finger) by the player seated at each of the stations for advancing a card game.

This sensor unit 20 has a function of an operation detection means and includes a light emitting unit 21 that irradiates a scanning light toward the image display unit 3 and light receiving units (light receiving cameras 22) provided at four positions diagonally around the light emitting unit 21. Then, infrared light is configured to be irradiated from the light emitting unit 21 so as not to be affected by ambient visible light. Although the sensor unit 20 is described as an infrared sensor unit here, it may be configured with a white light source and a camera. Furthermore, reflected light from the object operated by the player on the surface of the image display unit 3 is detected by the light receiving camera 22. Then, the camera 22 is configured to detect an amount of light to be changed based on the operation by the player's finger and process the detected signal so as to specify a specific operating location of each of the players.

It should be noted that, by providing a plurality (four) of the light receiving cameras 22, even in a case in which a plurality of the players make an operation simultaneously, it is possible to specify exact locations for multi-point operating locations based on information relating to an angle of the object (a finger) detected at each camera. In other words, since information relating to an angle of the object can be calculated from the four cameras 22, it is possible to exactly specify the operating locations operated by multi-point operation by way of combining information relating to an angle at each of the cameras based on a predetermined algorithm.

Furthermore, an image capturing means 30 for capturing an image displayed on the image display unit 3 and a player seated on the chair 5A is provided in the housing 2. This image capturing means 30 is configured with, for example, a CCD camera, and image data thus photographed is converted into electric signals so as to be used for various confirmation processing, verification processing, and the like by, for example, comparing thereof with a reference image with respect to, for example, the presence of a player, operating status of a player, and display status on the image display unit.

In the present embodiment, vertical supporting members 2*a* are fixed at each of the corners of the table 2A on the housing 2 and decorative top boards 2*b* substantially parallel with the table 2A are provided at the top of the supporting members 2*a*, and then frames 2*c* are provided inside the top boards 2*b* and a CCD camera 31 configuring the image capturing means is provided. More specifically, the frames 2*c* provided inside the top boards 2*b* are, as shown in FIG. 3A(a), bridged laterally along the diagonal lines, and the CCD camera 31 is provided above the location corresponding to the center of the image display unit 3.

For example, the CCD camera 31 is configured with a so-called dome camera that is housed in a dome-shaped housing fixed by the frames 2*c*, and can capture images of predetermined directions (each of the stations 5 and the image display unit 3) periodically by way of a rotating mechanism, tilt mechanism, and the like. Therefore, the CCD camera 31 can capture various images displayed on the image display unit 3 as well as all the players seated at the table 5A.

In addition, the configuration of the CCD camera 31, a mode of installation, an interval of image capturing, and the like, can be modified as appropriate, depending on a method of using the images. For example, as shown in FIG. 3A(b), a rectangular frame 2*c* is provided in the top board 2*c*, and then each of the CCD cameras 31 can be provided in a direction facing each of the stations 5. As shown in FIG. 3A(b), the CCD camera provided in the direction facing each of the stations 5 may photograph a single player by a single CCD camera or may photograph a plurality of players by a single CCD camera. With such a configuration, it is possible to photograph a facial expression of a player as well as the presence of a player. Therefore, it is possible to utilize image data thus photographed for, for example, face-recognition processing.

In addition, it is preferable for the above-mentioned image capturing means to be provided so as not to be visually recognized by a player seated at a chair. For example, by forming an opening which only exposes a lens portion so as to provide the CCD camera 31, it is possible to capture a necessary image without the player recognizing the camera.

Furthermore, in the housing 2, a speaker for playing music, sound effects, and the like, various lamps, and the like may be provided in addition to the abovementioned image capturing means.

Next, a control system of the gaming machine 1 thus configured as described above is explained with reference to FIGS. 5A to 7A.

Figure 5A:
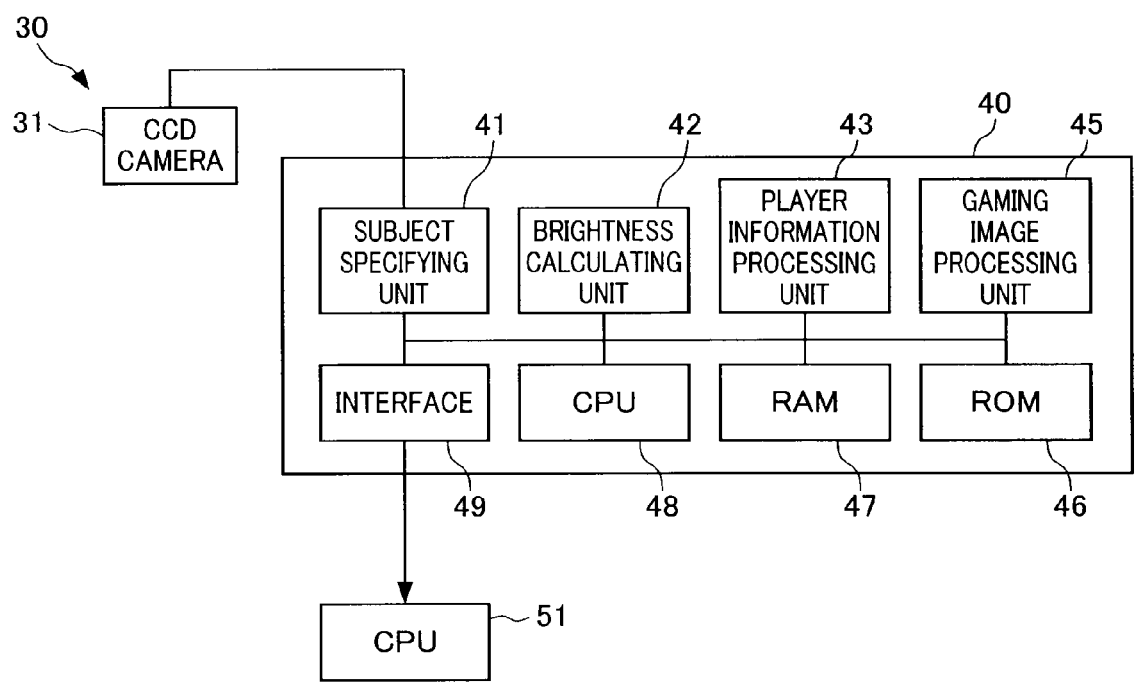
FIG. 5A is a block diagram showing a schematic configuration of image processing system for processing an image photographed by an image capturing means.

FIG. 5A is a block diagram showing a schematic configuration of an image processing system for processing images photographed by the abovementioned image capturing means 30.

As described above, the image capturing means 30 includes an image display unit 3 and a CCD camera (image capturing device) 31 that can photograph a player, and image capturing signals from the CCD camera 31 are processed by an image processing circuit (image processing means) 40.

The image processing circuit 40 includes: a subject specifying unit 41 that receives photographed signals from the CCD camera and specifies a subject; a brightness calculating unit 42 for converting each pixel of a photographed image of a subject specified by the subject specifying unit 41 into brightness information; a player information processing unit 43 that processes information relating to a player (presence or absence of the player, information relating to operations of the player, facial information, information relating to operations of the player made with the lapse of time, and the like) at each of the stations based on the brightness information calculated by the brightness information calculating unit 42; a gaming image processing unit 45 that processes information relating to a gaming image (such as contents of a gaming image, contents of a bet image, and location information thereof) displayed on the image display unit 3 based on the brightness information calculated by the brightness information calculating unit 42; ROM 46 in which an operation program, reference data to be compared with comparative criteria, masked data for masking unnecessary background images, and the like are stored; RAM 47 having a function of temporarily storing a running program, processed image data, and the like; and a CPU 48 that controls those units. These units are connected with each other via a bus and each of the units is configured to be controlled by the control CPU 48.

More specifically, regarding the image capturing signal photographed by the CCD camera 31, by specifying image information at the subject specifying unit 41 and, for example, by obtaining edge information at the player information processing unit 43, processing data as to whether a player is seated on the chair 5A at one of the stations 5 and data relating to an instructing location that a player operated by hand. Furthermore, based on the image information thus specified, gaming image data (such as image content displayed and a displaying location) displayed on the image display unit 3 can be processed at the gaming image processing unit 45.

Furthermore, various processing can be executed by converting the image information thus specified into data including brightness information for each pixel thereof at the brightness calculating unit 42. For example, in the player information processing unit 43, it is possible to obtain data relating to trends in a player's movement by detecting continuity regarding a portion in which differences of the brightness information are continued more than a predetermined threshold based on the photographed image photographed at every predetermined interval, or obtain data relating to identity verification by photographing a face of the player and comparing thereof with a reference image (reference data) stored preliminarily so as to use a correlation therebetween. It should be noted that, in a case in which images are photographed continuously, an image photographed at a prescribed point in time, an image stored in ROM preliminarily, or an image transmitted from another apparatus (such as a host computer) may be used as reference data.

In addition, by deleting an unnecessary background of the image capturing signal photographed by the CCD camera 31 or superimposing masked data stored in the ROM 46 in a case in which displayed contents on the image display unit 3 cannot be identified specifically, it is possible to obtain only an image of the table portion and an image of the player operating at the table. It is also possible to obtain image data (see FIG. 9A) that specifies a location of a player present at the station 5 and displayed contents of the image display unit 3 by transmitting the image data to a main control CPU 3 (described later) and actually combining thereof with image data displayed on the image display unit.

Then, the data relating to the processed image thus obtained is stored in the RAM 47 and transmitted to the main control CPU 51 in the game control means 15A that executes the following card game via an interface 49.

FIG. 6A is a block diagram showing a configuration of a game control means 15A of a control unit 15 that executes a card game.

The game control means 15A includes a main control CPU 51, ROM 52, and a microcomputer which is configured with a bus 54 as a core for transferring data mutually therebetween. Then, the CPU 51 is connected, via an I/O interface 57, with: the image processing circuit 40 that processes an image in which a player seated at each of the stations 5 and displayed contents on the image display unit 3 are photographed; an image control driving circuit 60 that controls various images displayed on the image display unit 3; and an operating location detecting circuit 61 that receives a detected signal from the sensor unit 20, which detects an operating location of a finger (object) of a player seated at each of the stations 5 and specifies the operating location of each of the players specifically; and the like.

The main control CPU 51 of the game control means 15A communicates various data such as bet information, award information, and the like, between each of the stations 5 via the I/O interface 57 and a communication interface 63, and has a function for mainly controlling each of the stations 5 and advancing a game. More specifically, the main CPU 51 specifies bet operation information made at each of the stations 5 through the operating location detecting circuit 61 and then accepts the bet information, executes win determination processing with respect to the chips bet, and calculates the amount of credits that is paid out at each of the stations 5 with reference to a payout table.

Furthermore, the ROM 52 in the game control means 15A is configured with, for example, a solid-state memory, and stored therein are, a program for realizing a basic function for advancing a baccarat game, a display operation program for controlling various image contents displayed on the image display unit 3 with a progression of a game, a program for receiving and paying out game media and the like, a payout table referred to for executing a baccarat game, and the like.

The RAM 53 is memory for temporarily storing various data computed by the CPU 51, and temporarily stores, for example, information relating to a player's operation (such as bet operating location and an amount of bet) through the controller at each of the stations 5 and an operating screen, information relating to an operating location specified by the operating location detecting circuit 61 for each of the stations 5, image capturing data photographed by the CCD camera 31 which is processed in the image processing circuit 40, data relating to a result of the processing executed by the CPU 51, and the like.

Then, the main control CPU 51 in the game control means 15A executes controlling processing with a progression of a game, such as control of various driving circuits and displayed images on the image display unit 3.

The image control driving circuit 60 is configured to include program ROM, image ROM, an image control CPU, work RAM, a VDP (video display processor), video RAM, and the like. The image control program and the like relating to a display of the image display unit 3 is stored in the program ROM, and various image data (pixel data) for forming an image displayed on the image display unit 3 is stored in the image ROM.

In addition, the image control CPU determines an image to be displayed on the image display unit 3 (projector 12) among pixel data stored in the image ROM according to the image control program stored in the program ROM preliminarily based on the parameters set by the CPU 51. Thus, a specific displaying location of a game image (card image) and an operating image (bet image) as shown in FIG. 4A, a timing for displaying an image with a progression of a game, and the like are controlled by the CPU 51.

In addition, the work RAM is configured as a temporary storage means for when executing the image control program is executed by the image control CPU, and the VDP forms an image corresponding to displayed contents determined by the image control CPU and projects thereof on the image display unit 3 via the projector 12.

The operating location detecting circuit 61 includes a CPU and the like that executes predetermined computing and has a function of specifying a location of an object (a finger of a player) present at the surface of the image display unit 3 specifically. More specifically, the operating location detecting circuit 61 receives a detected signal from the four cameras 22 of the sensor unit 20 provided in the housing 2 and has a function of specifying a portion where a player actually operated (a specific location instructed by a finger of the player) on the image display unit 3. In this case, the operating location detecting circuit 60 derives angular information of the object thus detected based on detected locations inputted from each of the four cameras 22, and has a function of specifying a location of the finger pointing on the image display unit 3. By using the four cameras 22, it is possible to specify the location exactly based on detection information obtained from each of the cameras, even if a player seated at each of the stations 5 executes instructing operations simultaneously.

Furthermore, the CPU 51 includes an identification processing function for identifying whether a player's operation matches location information obtained at the operating location detecting circuit 61 based on information relating to an operating location of a player which is obtained from the operating location detecting circuit 61 and an operating image of the player which is obtained from the image processing circuit 40 (this identification processing is described later).

Moreover, the CPU 51 can communicate information with an external device 100 such as a host computer via the communication interface 63. In this case, it can be assumed that, for example, information relating to running states of a gaming machine of interest for every prescribed time interval, information relating to payout rates of the gaming media at each of the stations, verification information of players seated at the stations, and the like are transmitted to the external device 100. In addition, it can be assumed that reference image data such as a facial information of a player present at an amusement facility, ID information of a card that each of the players possesses, and the like are transmitted from the external device.

Next, a configuration according to a control system of the station 5 connected with the CPU 31 is described.

Figure 7A:
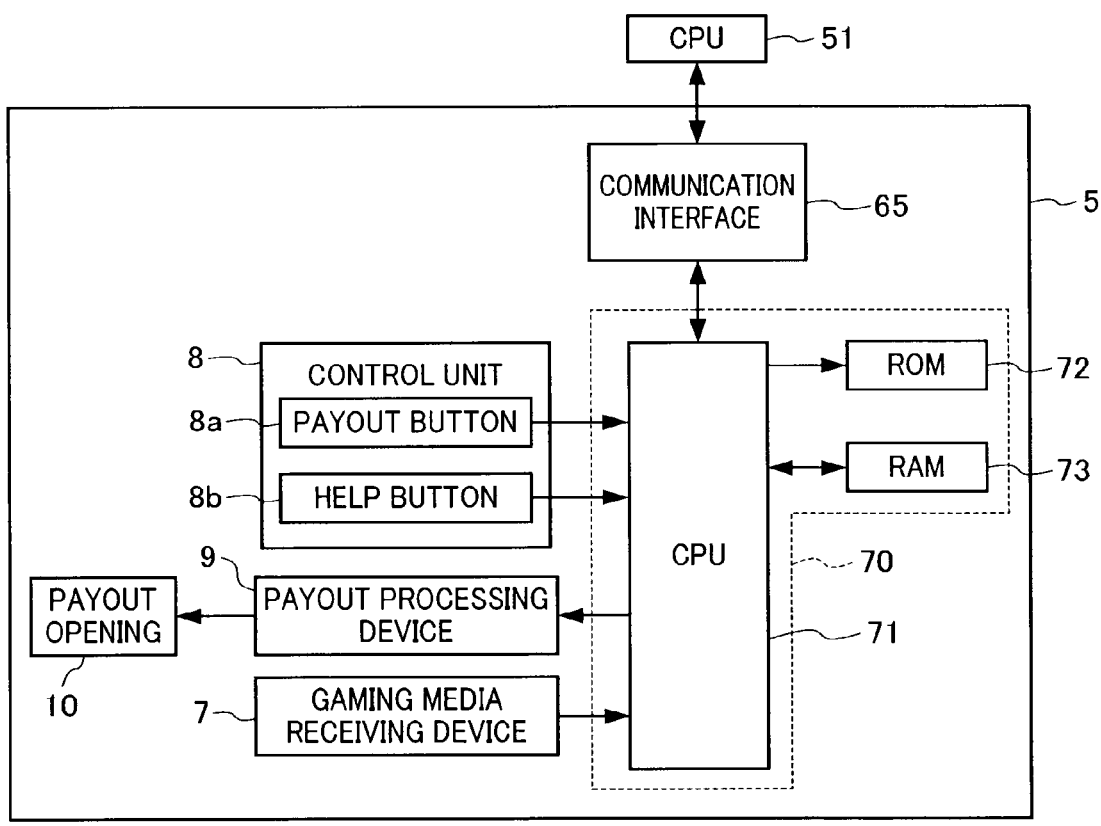
FIG. 7A is a block diagram showing a control system at each of the stations.

FIG. 7A is a block diagram schematically showing a control system of a station 5 according to the present embodiment. The station 5 includes a player-used controller 70 for controlling an operation at the station and the abovementioned peripheral apparatuses (such as the gaming media receiving device 7, the controller 8, and a payout processing device 9).

The player-used controller 70 includes a CPU 71, ROM 72, and RAM 73 for controlling the station and communicates data with the main control CPU 31 in the abovementioned game control means 15A via a communication interface 65.

The ROM 72 is configured with, for example, a solid-state memory, and in the station 5, a program for realizing a basic function, various programs necessary for controlling thereof at another station, and the like, are stored.

The RAM 73 is memory for temporarily storing various data computed by the CPU 71, an amount of credits that a player currently possesses, a bet status of chips by the player, and the like.

Furthermore, a payout button 8a and a help button 8b, which are provided at the controller 8 (see FIG. 1A), are connected to the CPU 71, respectively, and the CPU 71 controls execution of various corresponding operations based on operational signals outputted such as by pushing each button.

Then, an input signal by the player's operation is transmitted to the main control CPU 31.

In addition, a payout processing device 9 is connected to the CPU 71, and it is possible to pay out gaming media such as medals from the payout opening 10 based on a payout instruction signal from the CPU 71. Moreover, the gaming media receiving device 7 to which the gaming media such as coils, medals, and the like is connected to the CPU 71. The gaming value information (credit information) transmitted from the gaming media receiving device 7 is stored in the RAM 73.

As described above, in the gaming machine 1 in which the CCD camera 31 is provided as an image capturing means, it is determined as to whether the player who placed a bet is seated on a station of interest when a bet operation was made at the station. This determination can be executed based on operating location information from the abovementioned operating location detecting circuit 61 and player image information from the image processing circuit 40, and the determination processing is executed in the main control CPU 51 of the game control means 15A. That is, the CPU 51 has a function for determining whether bet operation information at each of the stations is performed by a player present at a station of interest as a determination means.

Figure 8A:
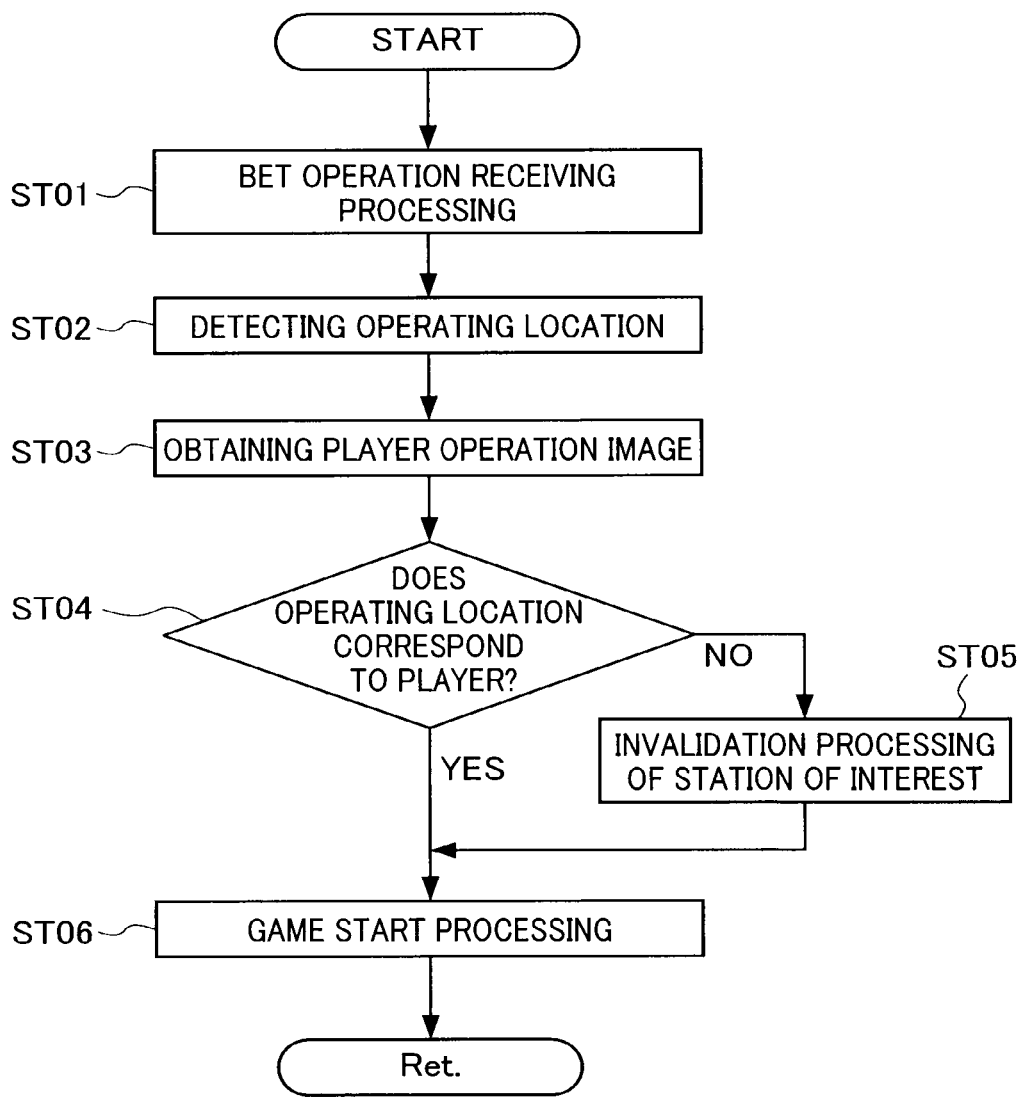
FIG. 8A is a flowchart showing a procedure for executing determination processing regarding a player performing a bet operation.

In the following, a procedure of the determination means executed in the CPU 51 is described with reference to a flowchart in FIG. 8A.

Initially, receiving processing such as displaying a bet operation image at each of the stations 5 is executed at the beginning of a game (ST01). A bet operation performed by a player is detected by the sensor unit 20, and the operating location thereof is detected at the operating location detecting circuit 61 (ST02). A specific bet location in each of the bet areas 3a on the bet operating screen is specified preliminarily. Therefore, when the operation is detected at the specific location, it is recognized that the bet operation is performed at a station corresponding to the operating location thus detected.

Next, a player operation image when the operating location was detected is obtained from the image capturing data by the CCD camera 31 (ST03). As shown in FIG. 9A, the image thus obtained shows a state in which a player P seated at a station operates the bet area 3a on the bet screen. This image data may be image data photographed by the CCD camera 31 or data in which the image data photographed by the CCD camera 31 is masked and superimposed with game image data and bet image data displayed on the image display unit 3, as described above.

Then, whether the player was seated on the station corresponding to the operating location specified by the operating location detecting circuit 61 and operated, i.e. whether the operating location thus detected corresponds to the player, is determined (ST04).

In this determination processing, in a case in which the operating location thus detected corresponds to the player (ST04, YES), start processing of a game is executed successively (ST06). Furthermore, in this determination processing, in a case in which the operating location thus detected does not correspond to the player (ST04, NO), it is recognized that the bet operation processing at the station was performed fraudulently or erroneously, the bet processing at the station is invalidated (ST05), and then, start processing of a game is executed afterward (ST06).

According to the abovementioned gaming machine, when each of the players performs a bet operation at each of the stations 5, the CCD camera 31 provided above photographs a bet operation of the player, and thus, an actual player is identified by using the player capturing information and actual bet information. Therefore, it is possible to detect an erroneous operation or a fraudulent operation by a person other than the player present at the station.

Furthermore, in a case in which it is determined that a bet operation is erroneous, the gaming machine 1 not only invalidates the bet processing at the station, but also notifies thereof by way of, for example, sound or a lamp, or alternatively, the information regarding the notification may be transmitted to an external device such as a host computer.

In the foregoing, although the gaming machines according to the present invention are described, the present invention is not limited thereto, and may have a variety of modifications thereto.

For example, a configuration of the gaming machine and an object for specifying an operating location can be modified as appropriate. For example, it is not limited to a hand of a player, and a configuration may be made which specifies a location of an operation item that a player handles. Furthermore, although the image display unit 3 is configured so as to project a game image by way of the projector provided in the housing 2, the present invention may be configured with a liquid crystal display and the like. Furthermore, a configuration of the station 5 in which a game is executed and an operation device may be modified as appropriate, depending on a game executed.

The descriptions regarding the second embodiment are provided above.

In the following, an example of a configuration of a gaming machine according to the present invention (a third example) is described in detail.

Figure 1B:
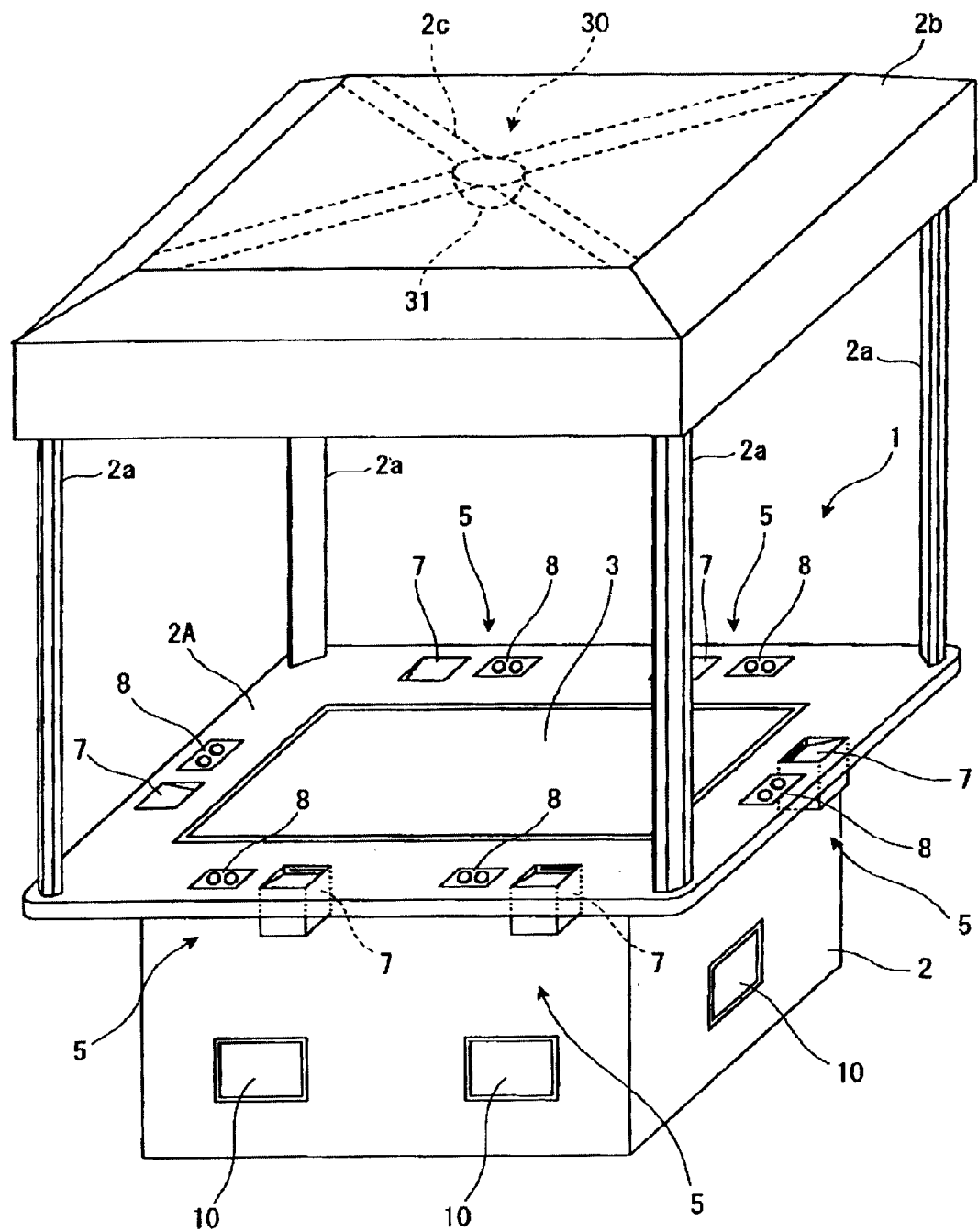
FIG. 1B is a perspective view of an entire configuration of an embodiment of a gaming machine.
Figure 2B:
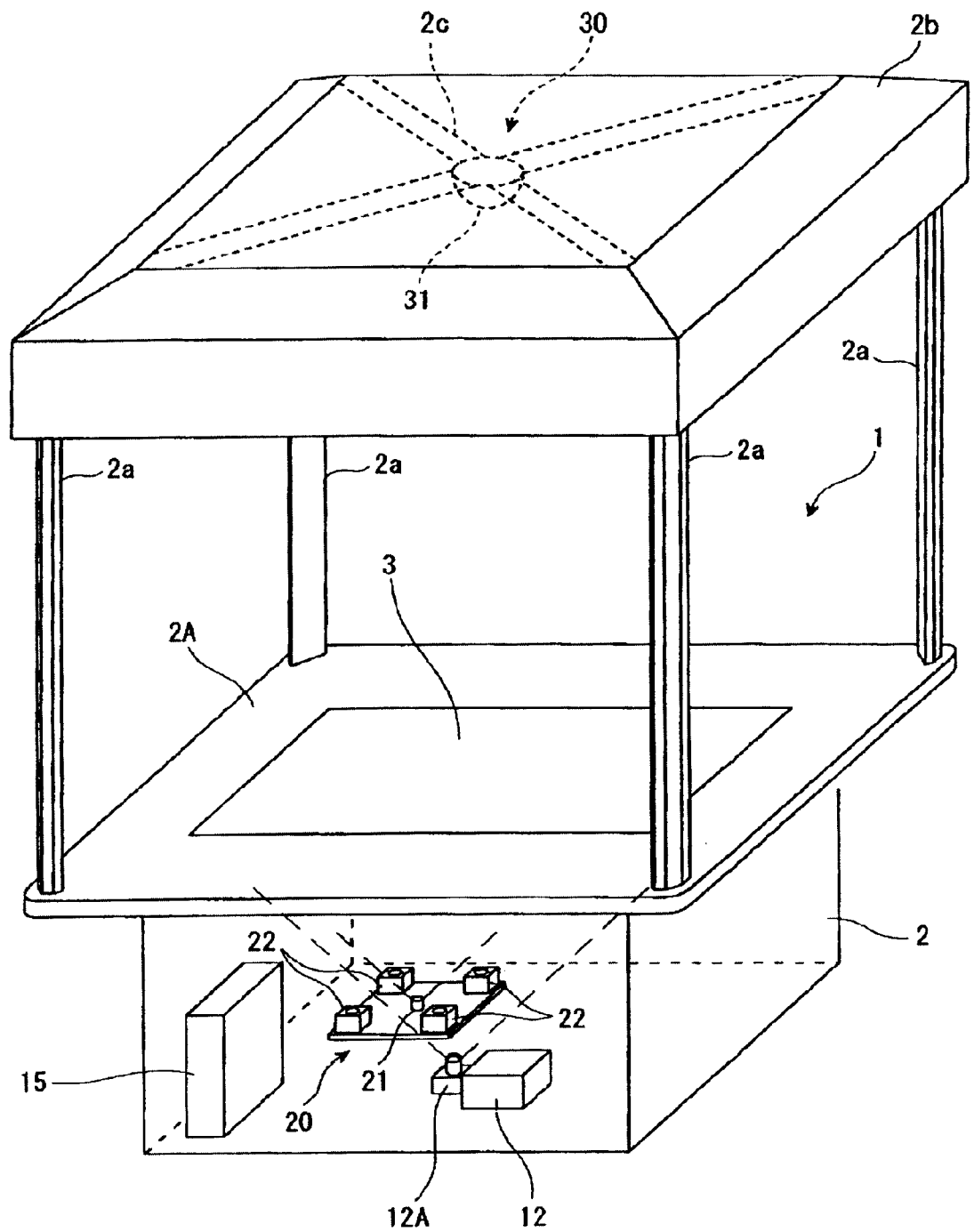
FIG. 2B is a schematic view of an internal configuration of a gaming machine.
Figure 4B:
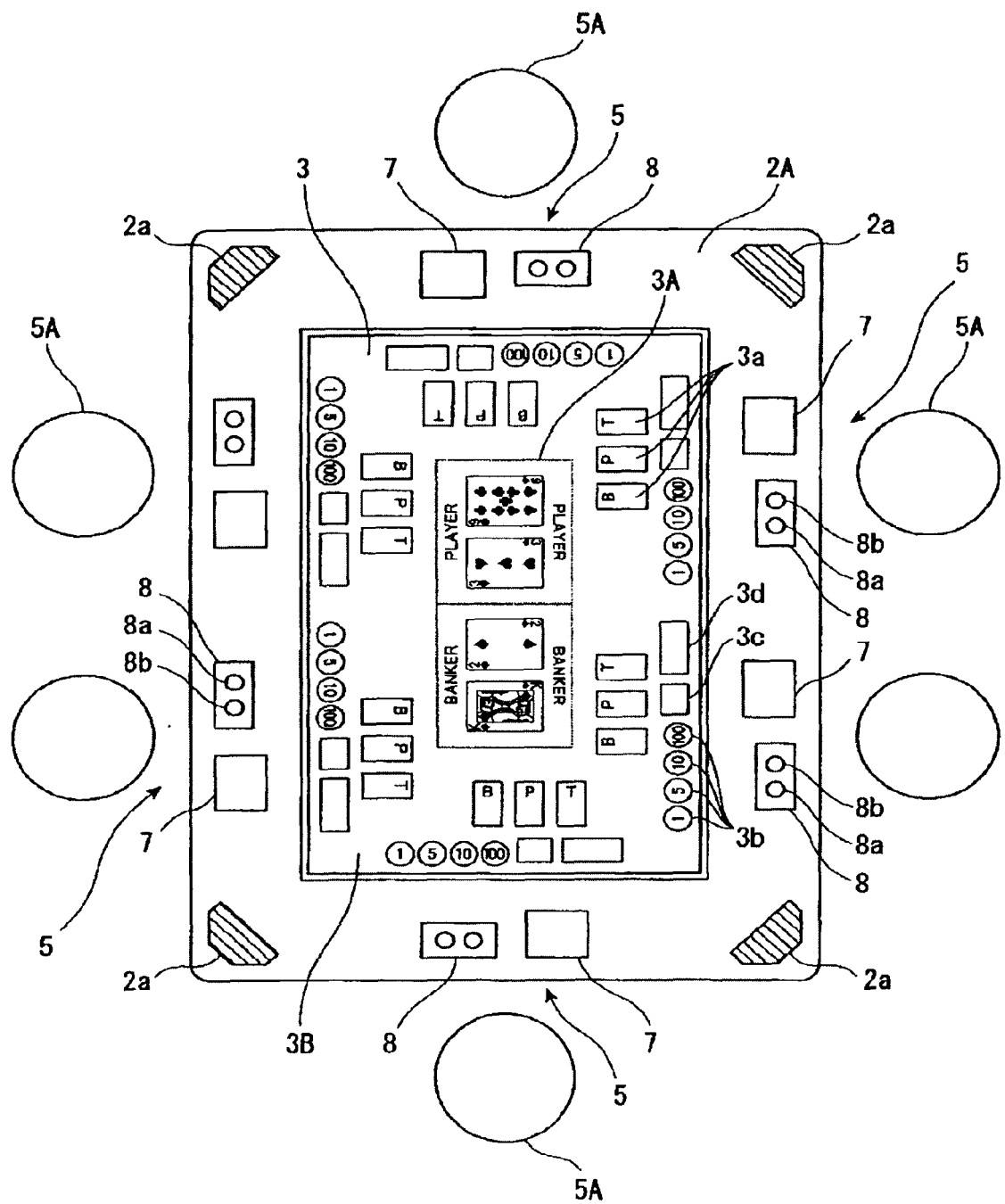
FIG. 4B shows an example of a game performed on an image display unit.

FIG. 1B is a perspective view of an overall configuration of an embodiment of a gaming machine. FIG. 2B is a schematic view of an internal configuration of a gaming machine. FIG. 3B shows a location of an image capturing means and, more specifically, FIG. 3B(a) shows the image capturing means being disposed at a central location and FIG. 3B(b) shows a modified example of a location of the image capturing means. FIG. 4B shows an example of a game performed on an image display unit.

A gaming machine 1 of the present embodiment is configured so that an image display unit 3 is provided on an upper face (a table 2A) of a table-shaped housing 2 and six stations 5 are provided so that six players can play a game therearound. A chair 5A is provided at each of the stations. Thus, players seated on each of the stations 5 can participate in various games such as a card game, roulette game, a dice game, and the like, executed at the center of the image display unit 3. The players can participate in a game executed at the center of the display and receive payouts at the end of a game by using gaming media such as medals, coins, paper money, a prepaid card, and the like.

As described above, a game is advanced by way of a control unit provided in the housing 2 and an image projecting means controlled by the control unit. This control unit not only advances a game but also executes receiving a bet operation by a player at each of the stations and performs paying out of gaming media corresponding to a bet amount to a player when the player wins an award based on a result of the game.

The station 5 may be configured so as to allow the player to participate in a game and perform a bet operation, and includes at least the gaming media receiving unit 7 to which the gaming media is inserted when playing a game and a controller 8 including a plurality of control buttons to which a predetermined instruction is input by the player. It should be noted that, as shown in the drawings, although the controller 8 is provided at a table portion of the housing 2, it may be configured so that functions arising by way of operating a control button are realized through an operated image displayed on the image display unit 3, or conversely, that some of the operations through the image display unit are performed by the control button instead.

As shown in FIG. 4B, in the present embodiment, a baccarat game, which is one type of card games is performed in an image of the image display unit 3. More specifically, a playing area 3A in which cards distributed to "BANKER" and "PLAYER" are shown is provided in the central area of the image display unit 3, and an operation area 3B in which a bet operation can be performed through each of the stations 5 can be performed for a game executed in the playing area 3A is provided at the peripheral area of the image display unit 3.

The operation area 3B is one of the components of each of the stations 5. Hence, in the operation area 3B, it is configured that a bet operation screen, a help information screen, and the like are displayed on each of the stations 5. In FIG. 4B, all of the stations 5 are set in a state in which the bet operation screens thereof are displayed and the bet operation screens are configured with to include a bet area 3a where a player at each of the stations places a bet on "BANKER", "PLAYER", or "DRAW", a chip display area 3b for displaying chips, a select operation area 3c for selecting a bet, and a credit information display area 3d for displaying information of remaining credits.

In this case, a player can perform a bet operation, for example, by pushing an amount of the desired chips among "1", "5", "10", and "100" displayed in the chip display area 3b with a finger, and dragging thereof, in the present state, to a display areas of "BANKER", "PLAYER", or "DRAW" in the bet area 3a, or alternatively, without dragging by pushing any one of "BANKER", "PLAYER", or "DRAW" in the bet area 3a, in the present state, with a finger. Then, after the bet operation, the bet operation is fixed by way of pushing the select operation area 3c using a player's finger. It should be noted that, regarding the abovementioned bet operation by a player, specific instructing locations are specified by a sensor unit 20 (described later) provide in the housing 2.

Then, after a game has ended, the amount of credits corresponding to the amount of chips bet is added to the amount of credits that a player currently possesses and the resulting amount of credits is displayed on the credit information display area 3d.

The gaming media receiving unit 7 is configured so that gaming media having a gaming value, such as medals, coins, paper money, prepaid card, and the like, is inserted, and is provided at each of the station 5. The player can execute a game with the gaming media thus inserted, and the amount thereof is displayed on the credit information display area 3d.

The controller 8 is provided at each of the stations 5 and includes buttons that a player operates by pushing with a progression of the game. These buttons include, for example, a cashout button 8a, which is pushed at the end of a game, and a help button 8b.

The cashout button 8a is generally pushed at the end of a game. When the cashout button 8a is pushed, the amount of credits corresponding to the amount of gaming media that a player has won in a game and currently possesses is paid out from a payout opening 10, which is provided on a side face of the housing 2. It should be noted that, in a case of inserting or paying out gaming media using a card, value information is overwritten by a reader/writer installed in the gaming media receiving unit 7, and then the card is ejected.

The help button 8b is a button which is pushed by a player when the player needs to know how to operate the game. Immediately after the help button 32 is pushed, a help screen showing various kinds of rules and operating information is displayed on the operation area 3B.

The image display unit 3 is configured with a member having transparency (a transparent screen) and so as to display light irradiated from a back side and more specifically, a game image (a card image shown in FIG. 4B) and an operation image (a bet image shown in FIG. 4B) projected from the image projecting means 12 provided on the housing 2. In this case, the image projecting means 12 is configured by a known projector, and has a function of enlarging various images (motion pictures and still pictures) transmitted from the control unit 15 which controls the player's operation at each of the stations by using an image forming means 12 including a magnifier so as to form images on the image display unit 3.

The control unit 15 includes functions as an image control means for controlling gaming image data and bet operation image data displayed on the image display unit 3 and a function for controlling a progression of a game as well as various images displayed on the image display unit 3 as a game control means. This control unit 15 may be configured as a dedicated unit which is preliminarily installed in the housing 2 or may be configured in which a unit such as a personal computer (PC) storing data relating game procedures and various image data is incorporated in the housing 2. Furthermore, this control unit 15 may be configured so as to communicate various information with, for example, a host computer installed in an amusement facility, another gaming device, and the like, communication network such as internet, local area network, and the like.

In addition, a sensor unit 20 is provided in the housing 2 that specifically detects operations (in the present embodiment, locations instructed by a player's finger) by the player seated at each of the stations for advancing a card game.

This sensor unit 20 has a function of an operation detection means and includes a light emitting unit 21 that irradiates a scanning light toward the image display unit 3 and light receiving units (light receiving cameras 22) provided at four positions diagonally around the light emitting unit 21. Then, infrared light is configured to be irradiated from the light emitting unit 21 so as not to be affected by ambient visible light. Furthermore, reflected light from the object operated by the player on the surface of the image display unit 3 is detected by the light receiving camera 22. Then, the camera 22 is configured to detect an amount of light to be changed based on the operation by the player's finger and process the detected signal so as to specify a specific operating location of each of the players.

It should be noted that, by providing a plurality (four) of the light receiving cameras 22, even in a case in which a plurality of the players acts simultaneously, it is possible to specify exact locations for multipoint operating locations based on information relating to an angle of the object (a finger) detected at each camera. In other words, since information relating to an angle of the object can be calculated from the four cameras 22, it is possible to exactly specify the operating locations operated by multipoint operation by combining information relating to an angle at each of the cameras based on a predetermined algorithm.

Furthermore, an image capturing means 30 for capturing an image displayed on the image display unit 3 and a player seated on the chair 5A is provided in the housing 2. This image capturing means 30 is configured with, for example, a CCD camera, and image data thus photographed is converted into electric signals so as to be used for various confirmation processing, verification processing, and the like by, for example, comparing thereof with a reference image with respect to, for example, the presence of a player, operating status of a player, and display status on the image display unit.

In the present embodiment, vertical supporting members 2a are fixed at each corner of the table 2A on the housing 2 and decorative top boards 2b are provided to be substantially parallel with the table 2A at the top of the supporting members 2a, and then frames 2c are provided inside the top boards 2b and a CCD camera 31 configuring the image capturing means is provided. More specifically, the frames 2c provided inside the top boards 2b are, as shown in FIG. 3B(a), bridged laterally along the diagonal lines, and the CCD camera 31 is provided above the location corresponding to the center of the image display unit 3. In other words, in the present embodiment, supporting members 2a extend upwards from four corners of the housing 2, respectively, and the CCD camera 31 as an image capturing means 30 is supported by the supporting member 2a via the frame 2c at the center of the image display unit 3 which is above the housing 2. That is, the image capturing means 30 is integrally fixed to the housing 2.

For example, the CCD camera 31 is configured with a so-called dome camera that is housed in a dome-shaped housing fixed by the frames 2c, and can capture images of predetermined directions (each of the stations 5 and the image display unit 3) periodically by way of a rotating mechanism, tilt mechanism, and the like. Therefore, the CCD camera 31 can capture various images displayed on the image display unit 3 as well as all the players seated at the table 5A.

It should be noted that the configuration of the CCD camera 31, a mode of installation, an interval of image capturing, and the like, can be modified as appropriate, depending on an application method of the images. For example, as shown in FIG. 3B(b), a rectangular frame 2c is provided in the top board 2b, and then each of the CCD cameras 31 can be provided in a direction facing each of the stations 5. As shown in FIG. 3B(b), the CCD camera provided in the direction facing each of the stations 5 may photograph a single player by a single CCD camera or may photograph a plurality of players by a single CCD camera. With such a configuration, it is possible to photograph a facial expression of a player as well as the presence of a player. Therefore, it is possible to utilize image data thus photographed for, for example, face-recognition processing. In other words, since each of the stations 5 can be photographed directly from the front by way of the image capturing means 30, a face of a player playing at each of the stations 5 can be photographed reliably, thereby enabling visual recognition of a gaming state, fraudulence, and the like reliably for each of the stations 5. Furthermore, as shown as a dashed lines in FIG. 3B(b), the CCD camera 31 configuring the image capturing means 30 may be fixed directly with the supporting member 2a which extends from the housing 2. That is, the CCD camera 31 may be supported by the supporting members 2a at the four corners of the housing 2. With this configuration, a player and a surrounding environment of the image display unit 3 can be photographed diagonally with respect to the image display unit 3, and thus, the player and the surrounding environment of the image display unit 3 can be photographed clearly from the front. Thus, it can enhance visual recognition and can visually recognize a gaming state, fraudulence, and the like reliably.

In addition, it is preferable for the above-mentioned image capturing means to be provided so as not to be visually recognized by a player seated at a chair. For example, by forming an opening which only exposes a lens portion so as to provide the CCD camera 31, it is possible to capture a necessary image without the player recognizing the camera.

Furthermore, in the housing 2, a speaker for playing music, sound effects, and the like, various lamps, and the like may be provided in addition to the abovementioned image capturing means.

Next, a control system of the gaming machine 1 thus configured as described above is explained with reference to FIGS. 5B to 7B.

Figure 5B:
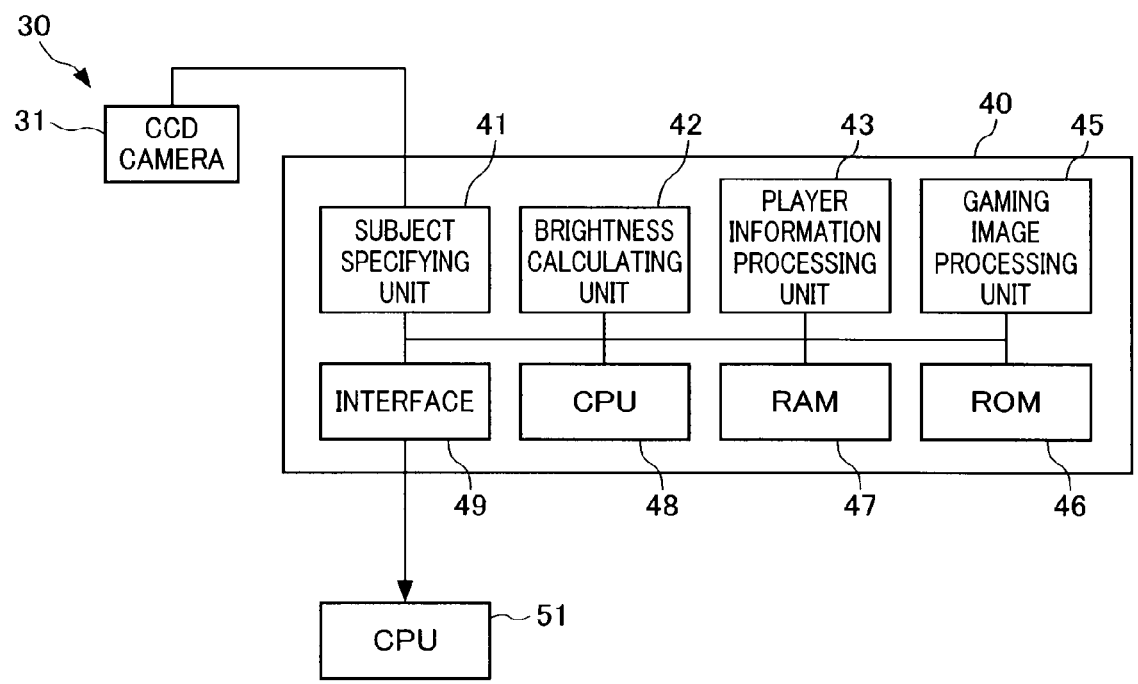
FIG. 5B is a block diagram showing a schematic configuration of an image processing system for processing an image photographed by an image capturing means.

FIG. 5B is a block diagram showing a schematic configuration of an image processing system for processing images photographed by the abovementioned image capturing means 30. As described above, the image capturing means 30 includes an image display unit 3 and a CCD camera (image capturing device) 31 that can photograph a player, and image capturing signals from the CCD camera 31 are processed by an image processing circuit (image processing means) 40.

The image processing circuit 40 includes: a subject specifying unit 41 that receives photographed signals from the CCD camera and specifies a subject; a brightness calculating unit 42 for converting each pixel of a photographed image of a subject specified by the subject specifying unit 41 into brightness information; a player information processing unit 43 that processes information relating to a player (presence or absence of the player, information relating to operations of the player, facial information, information relating to operations of the player made with the lapse of time, and the like) at each of the stations based on the brightness information calculated by the brightness information calculating unit 42; a gaming image processing unit 45 that processes information relating to a gaming image (such as contents of a gaming image, contents of a bet image, and location information thereof) displayed on the image display unit 3 based on the brightness information calculated by the brightness information calculating unit 42; ROM 46 in which an operation program, reference data to be compared with comparative criteria, masked data for masking unnecessary background images, and the like are stored; RAM 47 having a function of temporarily storing a running program, processed image data, and the like; and the CPU 48 that controls those units. These units are connected with each other via a bus and each of the units is configured to be controlled by the control CPU 48.

More specifically, regarding the image capturing signal photographed by the CCD camera 31, by specifying image information at the subject specifying unit 41 and, for example, by obtaining edge information at the player information processing unit 43, processing data as to whether a player is seated on the chair 5A at one of the stations 5 and data relating to a instructing location operated by a player's hand can executed. Furthermore, based on the image information thus specified, gaming image data (such as image contents displayed and a displaying location) displayed on the image display unit 3 can be processed at the gaming image processing unit 45.

Furthermore, various processing can be executed by converting the image information thus specified into data including brightness information for each pixel thereof at the brightness calculating unit 42. For example, at the player information processing unit 43, it is possible to obtain data relating to directions of a player's movement by detecting continuity regarding a portion in which differences of the brightness information are continued more than a predetermined threshold based on the captured image captured in every predetermined interval, or obtain data relating to identity verification by capturing a face of the player and comparing it with a reference image (reference data) stored preliminarily so as to use correlation therebetween. It should be noted that, in a case in which images are photographed continuously, an image photographed at a prescribed point in time, an image stored in ROM preliminarily, or an image transmitted from another apparatus (such as a host computer) may be used as reference data.

In addition, by deleting an unnecessary background of the image capturing signal photographed by the CCD camera 31 or superimposing masked data stored in the ROM 46 in a case in which displayed contents on the image display unit 3 cannot be identified specifically, it is possible to obtain only an image of the table portion and an image of the player operating at the table. It is also possible to obtain image data that specifies a location of a player present at the station 5 and displayed contents of the image display unit 3 by transmitting the image data to a main control CPU 51 (described later) and actually combining thereof with image data displayed on the image display unit.

Then, the data relating to the processed image thus obtained is stored in the RAM 47 and transmitted to the main control CPU 51 in the game control means 15A that executes the following card game via an interface 49.

Figure 6B:
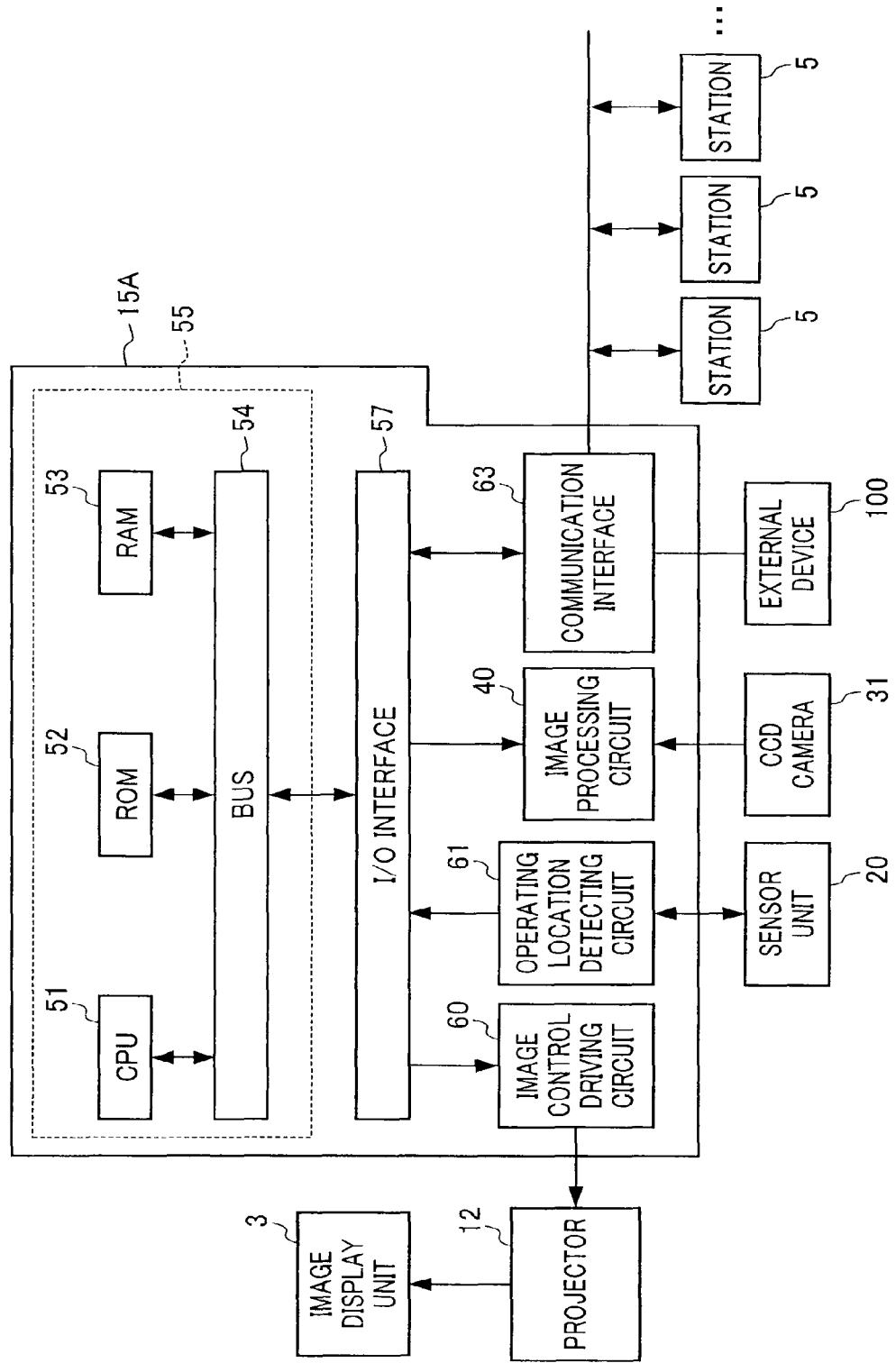
FIG. 6B is a block diagram showing a configuration of a game control means 15A of a control unit 15 that executes a card game.

FIG. 6B is a block diagram showing a configuration of a game control means 15A of a control unit 15 that executes a card game.

The game control means 15A includes a main control CPU 51, ROM 52, and a microcomputer which is configured with a bus 54 as a core for transferring data mutually therebetween. Then, the CPU 51 is connected, via an I/O interface 57, with: the image processing circuit 40 that processes an image in which a player seated at each of the stations 5 and displayed contents on the image display unit 3 are photographed; an image control driving circuit 60 that controls various images displayed on the image display unit 3; and an operating location detecting circuit 61 that receives a detected signal from the sensor unit 20 which detects an operating location of a finger (object) of a player seated at each of the stations 5 and specifies the operating location of each of the players specifically; and the like.

The main control CPU 51 of the game control means 15A communicates various data such as bet information, award information, and the like, between each of the stations 5 via the I/O interface 57 and a communication interface 63, and has a function for mainly controlling each of the stations 5 and advancing a game. More specifically, the main CPU 51 specifies bet operation information made at each of the stations 5 through the operating location detecting circuit 61 and then accepts the bet information, executes win determination processing with respect to the chips bet, and calculates the amount of credits that is paid out at each of the stations 5 with reference to a payout table.

Furthermore, the ROM 52 in the game control means 15A is configured with, for example, a solid-state memory, and stored therein are a program for realizing a basic function for advancing a baccarat game, a display operation program for controlling various image contents displayed on the image display unit 3 with a progression of a game, a program for receiving and paying out game media and the like, a payout table referred to for executing a baccarat game, and the like, are stored.

The RAM 53 is memory for temporarily storing various data computed by the CPU 51, and temporarily stores, for example, information relating to a player's operation (such as bet operating location and an amount of bet) through the controller at each of the stations 5 and an operating screen, information relating to an operating location specified by the operating location detecting circuit 61 for each of the stations 5, image capturing data photographed by the CCD camera 31 which is processed in the image processing circuit 40, data relating to a result of the processing executed by the CPU 51, and the like.

Then, the main control CPU 51 in the game control means 15A executes control of processing with a progression of a game, such as controlling various driving circuits and displayed images on the image display unit 3.

The image control driving circuit 60 is configured to include program ROM, image ROM, an image control CPU, work RAM, a VDP (video display processor), video RAM, and the like. The image control program and the like relating to a display of the image display unit 3 is stored in the program ROM, and various image data (pixel data) for forming an image displayed on the image display unit 3 is stored in the image ROM.

In addition, the image control CPU determines an image to be displayed on the image display unit 3 (projector 12) among pixel data stored in the image ROM according to the image control program stored in the program ROM preliminarily based on the parameter set by the CPU 51. Thus, a specific displaying location of a game image (card image) and an operating image (bet image) as shown in FIG. 4B, a timing for displaying an image with a progression of a game, and the like are controlled by the CPU 51.

In addition, the work RAM is configured as a temporary storage means for when executing the image control program is executed by the image control CPU, and the VDP forms an image corresponding to displayed contents determined by the image control CPU and projects thereof on the image display unit 3 via the projector 12.

The operating location detecting circuit 61 includes a CPU and the like that executes predetermined computing and has a function of specifying a location of an object (a finger of a player) present at the surface of the image display unit 3 specifically. More specifically, the operating location detecting circuit 61 receives a detected signal from the four cameras 22 of the sensor unit 20 provided in the housing 2 and has a function of specifying a portion where a player actually operated (a specific location instructed by a finger of the player) on the image display unit 3. In this case, the operating location detecting circuit 60 derives an angular information of the object thus detected based on detected locations inputted from each of the four cameras 22, and has a function of specifying a location of the finger pointing on the image display unit 3. By using the four cameras 22, it is possible to specify the location exactly based on detection information obtained from each of the cameras even if a player seated at each of the stations 5 executes instructing operations simultaneously.

Furthermore, the CPU 51 includes an identification processing function for identifying whether a player's operation matches location information obtained at the operating location detecting circuit 61 based on information relating to an operating location of a player which is obtained from the operating location detecting circuit 61 and an operating image of the player which is obtained from the image processing circuit 40.

Moreover, the CPU 51 can communicate information with an external device 100 such as a host computer via the communication interface 63. In this case, it can be assumed that, for example, information relating to running states of a gaming machine of interest for every prescribed time interval, information relating to payout rates of the gaming media at each of the stations, verification information of players seated at the stations, and the like are transmitted to the external device 100. In addition, it can be assumed that reference image data such as facial information of a player present at an amusement facility, ID information of a card that each of the players possesses, and the like are transmitted from the external device.

Next, a configuration according to a control system of the station 5 connected with the CPU 31 is described.

Figure 7B:
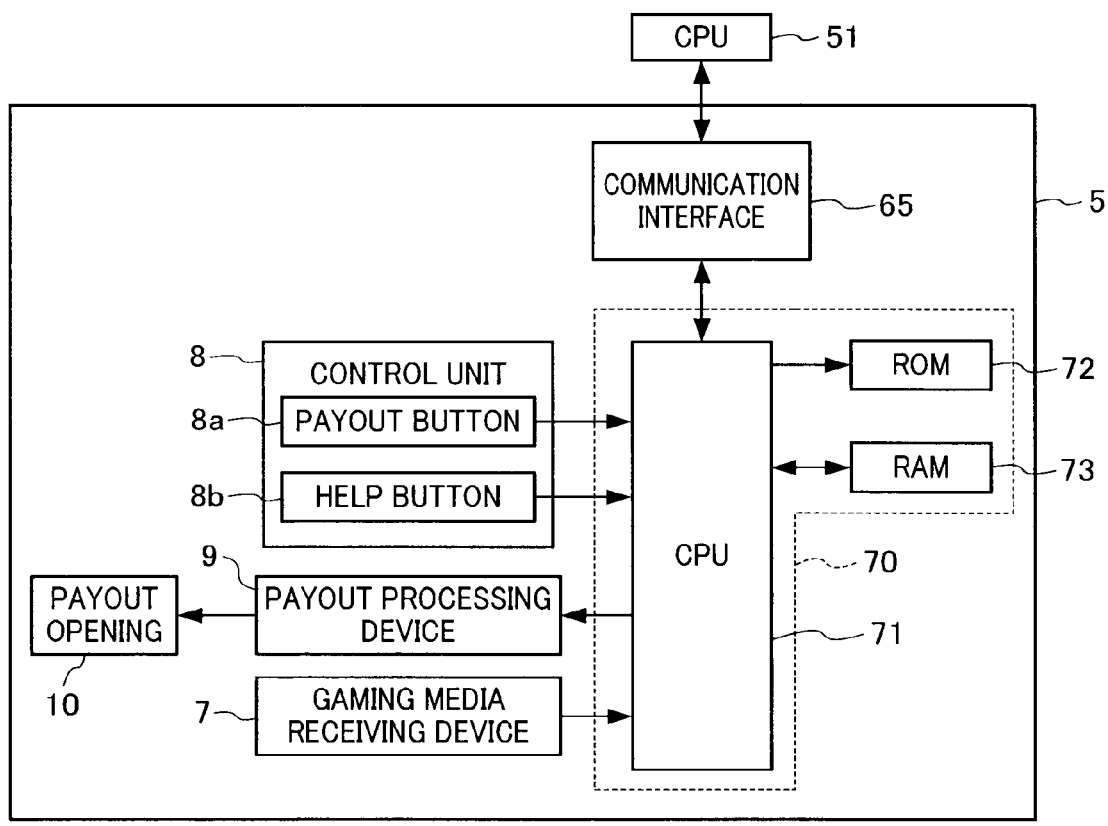
FIG. 7B is a block diagram showing a control system at each of the stations.

FIG. 7B is a block diagram schematically showing a control system of a station 5 according to the present embodiment. The station 5 includes a player-used controller 70 for controlling an operation at the station and the abovementioned peripheral apparatuses (such as the gaming media receiving device 7, the controller 8, and a payout processing device 9).

The player-used controller 70 includes a CPU 71, ROM 72, and RAM 73 for controlling the station and communicates data with the main control CPU 51 in the abovementioned game control means 15A via a communication interface 65.

The ROM 72 is configured with, for example, a solid-state memory, and in the station 5, a program for realizing a basic function, various programs necessary for controlling thereof at another station, and the like, are stored.

The RAM 73 is memory for temporarily storing various data computed by the CPU 71, an amount of credits that a player currently possesses, a bet status of chips by the player, and the like.

Furthermore, a payout button 8a and a help button 8b, which are provided at the controller 8 (see FIG. 1B), are connected to the CPU 71, respectively, and the CPU 71 controls execution of various corresponding operations based on operational signals outputted such as by pushing each button. Then, an input signal by the player's operation is transmitted to the main control CPU 51.

In addition, a payout processing device 9 is connected to the CPU 71, and it is possible to pay out gaming media such as medals from the payout opening 10 based on a payout instruction signal from the CPU 71. Moreover, the gaming media receiving device 7 to which the gaming media such as coils, medals, and the like is connected to the CPU 71. The gaming value information (credit information) transmitted from the gaming media receiving device 7 is stored in the RAM 73.

As described above, according to the present embodiment, since the image capturing means 30 (the CCD camera 31) which can photograph the player present at each of the stations 5 is integrally formed with the housing 2, and the housing 2 and the image capturing means 30 are configured as a single unit, as the entire gaming machine 1, a gaming state and fraudulence in a game can be visually recognized by way of the image capturing means 30, which is inherently provided with the gaming machine 1, and thus, fraudulence in a game can be easily recognized.

Furthermore, in the gaming machine 1 of the present embodiment, since the image capturing means 30 is fixed with the supporting members 2a, which extend from the housing 2, a gaming area can be captured extensively as a whole so as to space the image capturing means 30 away from a gaming area such as the station 5 and the image display unit 3, and the image capturing means 30 can also be securely supported by the supporting member 2a.

Furthermore, in the gaming machine 1 of the present embodiment, the supporting member 2a extends upwards from four corners of the housing 2, and the image capturing means 30 is supported by the supporting member 2a at the center of the image display unit 3, which is above the housing 2. Thus, since the image capturing means 30 can be securely supported above the image display unit 3 by the supporting members 2a, and the image capturing means 30 is supported at the center of the image display unit 3 by the supporting members 2a, even a single image capturing means 30 can capture the entire image display unit 3 effectively.

In the foregoing, although the gaming machines according to the present invention are described, the present invention is not limited thereto, and may have various modification thereto.

For example, a configuration of the gaming machine and an object for specifying an operating location can be modified as appropriate. For example, the object is not limited thereto, and a configuration may be made which specifies a location of an operation item that a player handles. Furthermore, although the image display unit 3 is configured so as to project a game image by way of the projector provided in the housing 2, the present invention may be configured with a liquid crystal display and the like. Furthermore, a configuration of the station 5 in which a game is executed and an operation device may be modified as appropriate, depending on a game executed.

The descriptions regarding the third embodiment are provided above.

What is claimed is:

1. A gaming machine comprising:
a housing, which is playable by a plurality of players, that includes a plurality of stations provided to the players, respectively;
an image capturing unit, provided at the housing, that photographs a player present at each of the stations to obtain captured information;
a balance status monitoring unit that monitors a balance status of a gaming value, the balance status representing a relationship between an amount of a gaming value paid out to the player according to a game result and an amount of a gaming value paid for a game by way of the bet operation; and
a determination unit that determines fraudulence or an error of a game by comparing a running state of a game which is obtained based on the captured information obtained by the image capturing unit with the balance status that is monitored by the balance status monitoring unit under a gaming environment where there is no observer.

2. A gaming machine comprising:
a housing, which is playable by a plurality of players, that includes a plurality of stations provided for the players, respectively;
an operation detection unit that detects an operation of a player present at each of the stations performing a bet operation to generate a detection signal;
an image capturing unit, provided at the housing, that photographs the player present at each of the stations to generate an image capturing signal;
a balance status monitoring unit that monitors a balance status of a gaming value, the balance status representing a relationship between an amount of a gaming value paid out to the player according to a game result and an amount of a gaming value paid for a game by way of the bet operation; and
a determination unit that determines fraudulence or an error of a game by comparing a running state of a game which is obtained based on at least the detection signal from the operation detection unit and the image capturing signal from the image capturing unit with the balance status that is monitored by the balance status monitoring unit.

3. The gaming machine according to claim 2, further comprising a notification unit that notifies information on the fraudulence or the error when the determination unit determines that a game has the fraudulence or the error.

4. A gaming management system comprising:
a plurality of gaming machines each comprising
a housing, which is playable by a plurality of players, that includes a plurality of stations provided for the players, respectively,
an operation detection unit that detects an operation of a player present at each of the stations performing a bet operation to generate a detection signal,
an image capturing unit, provided at the housing, that photographs a player present at each of the stations to generate an image capturing signal, and
a balance status monitoring unit that monitors a balance status of a gaming value, the balance status representing a relationship between an amount of a gaming value paid out to the player according to a game result and an amount of a gaming value paid for a game by way of the bet operation;
a host computer that is connected to the gaming machines, receives the detection signal from the operation detection unit of each of the gaming machines, the image capturing signal from the image capturing unit at each of the gaming machines and information relating to the balance status from the balance status monitoring unit of each of the gaming machines, and determines fraudulence or an error of a game by comparing a operating state of a game which is obtained based on at least the detection signal and the image capturing signal with the balance status; and
a display unit that is connected to the host computer, and displays information relating to the balance status of each of the gaming machines received by the host computer.

5. The gaming management system according to claim 4, wherein the host computer notifies information on the fraudulence or the error when the host computer determines that a game has fraudulence or an error.

* * * * *